United States Patent
Prats

(10) Patent No.: US 10,085,211 B2
(45) Date of Patent: Sep. 25, 2018

(54) COMMUNICATION OF PROCESSOR STATE INFORMATION

(71) Applicant: Apple Inc., Cupertino, CA (US)

(72) Inventor: Augustin Prats, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/789,680

(22) Filed: Jul. 1, 2015

(65) Prior Publication Data

US 2016/0066273 A1    Mar. 3, 2016

Related U.S. Application Data

(60) Provisional application No. 62/044,712, filed on Sep. 2, 2014.

(51) Int. Cl.
| | |
|---|---|
| *H04W 52/02* | (2009.01) |
| *H04W 24/02* | (2009.01) |
| *H04W 76/14* | (2018.01) |
| *H04W 76/27* | (2018.01) |

(52) U.S. Cl.
CPC ....... *H04W 52/0229* (2013.01); *H04W 24/02* (2013.01); *H04W 76/14* (2018.02); *H04W 76/27* (2018.02); *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/23* (2018.01); *Y02D 70/26* (2018.01)

(58) Field of Classification Search
CPC ................................................ H04W 52/0229
See application file for complete search history.

(56) References Cited

U.S. PATENT DOCUMENTS

| | | | | |
|---|---|---|---|---|
| 7,987,378 | B2 * | 7/2011 | Lee ...................... | H04W 52/028 713/300 |
| 8,824,378 | B2 * | 9/2014 | Wentink ............ | H04W 52/0235 370/329 |
| 8,855,087 | B2 * | 10/2014 | Banerjee ............. | H04L 67/1095 370/338 |
| 8,909,282 | B2 * | 12/2014 | Ngai ................... | H04W 52/226 455/127.1 |

(Continued)

*Primary Examiner* — Parth Patel
(74) *Attorney, Agent, or Firm* — Kilpatrick Townsend & Stockton LLP

(57) ABSTRACT

A first device and a second device, having established a communications link with each other, can manage intra-device communication and inter-device communication using hardware and/or software state information (e.g. on/off) of the devices. The first device can record a change in state of a first processor of the first device. The first device can use the stored state information to determine whether to perform operations that involve processing by the first processor, e.g., delivering a message from the second device to the first processor. The first device can also send the change in the state of the first processor to the second device. The second device can record the change in the state of the first processor. The second device can use the stored state information to determine whether to perform operations that involve processing by the first processor, e.g., sending a message over the communications link.

16 Claims, 11 Drawing Sheets

(56) References Cited

U.S. PATENT DOCUMENTS

| | | | |
|---|---|---|---|
| 9,055,532 B2* | 6/2015 | Park | H04W 52/0235 |
| 9,059,861 B2* | 6/2015 | Iyer | H04L 12/189 |
| 9,100,921 B2* | 8/2015 | Xu | H04W 52/08 |
| 9,125,160 B2* | 9/2015 | Lee | H01M 10/44 |
| 9,456,422 B2* | 9/2016 | Chande | H04W 52/244 |
| 9,462,555 B2* | 10/2016 | Jain | H04W 52/0258 |
| 2009/0180415 A1* | 7/2009 | Park | H04L 67/327 370/311 |
| 2010/0111066 A1* | 5/2010 | Mehta | H04W 52/0216 370/345 |
| 2011/0201343 A1* | 8/2011 | Pinheiro | H04W 76/046 455/450 |
| 2011/0320607 A1* | 12/2011 | Harrang | H04W 4/02 709/226 |
| 2012/0147802 A1* | 6/2012 | Ukita | H04W 52/0216 370/311 |
| 2013/0024706 A1* | 1/2013 | Katar | H04L 12/12 713/321 |
| 2013/0053024 A1* | 2/2013 | Zou | H04W 52/0206 455/424 |
| 2013/0135669 A1* | 5/2013 | Ide | G06K 15/02 358/1.15 |
| 2013/0223339 A1* | 8/2013 | Nakahara | H04W 8/18 370/328 |
| 2013/0258930 A1* | 10/2013 | Clark | H04W 52/0235 370/311 |
| 2013/0329618 A1* | 12/2013 | Panneerselvam | H04W 52/0235 370/311 |
| 2014/0003312 A1* | 1/2014 | Sergeyev | H04W 28/08 370/311 |
| 2014/0064164 A1* | 3/2014 | Nagaraj | H04W 52/0206 370/311 |
| 2014/0129859 A1* | 5/2014 | O'Malley | G06F 1/3209 713/323 |
| 2014/0134993 A1* | 5/2014 | Kwak | H04W 52/0206 455/418 |
| 2014/0153512 A1* | 6/2014 | Koskela | H04L 1/00 370/329 |
| 2014/0200003 A1* | 7/2014 | Kodali | H04W 36/30 455/436 |
| 2014/0240138 A1* | 8/2014 | Lee | H04M 1/7253 340/636.1 |
| 2014/0301373 A1* | 10/2014 | Cili | H04W 76/048 370/336 |
| 2014/0341101 A1* | 11/2014 | Ganapathy | H04W 52/0206 370/311 |
| 2015/0016321 A1* | 1/2015 | Miryala | H04W 52/0209 370/311 |
| 2015/0038115 A1* | 2/2015 | Kim | H04L 63/101 455/411 |
| 2015/0092547 A1* | 4/2015 | Wu | H04W 4/14 370/230 |
| 2015/0103708 A1* | 4/2015 | Kang | H04W 76/023 370/311 |
| 2015/0111574 A1* | 4/2015 | Fukumasa | H04W 4/005 455/435.1 |
| 2015/0119103 A1* | 4/2015 | Ngai | H04W 48/18 455/552.1 |
| 2015/0223171 A1* | 8/2015 | Wang | H04W 76/045 455/422.1 |
| 2015/0237633 A1* | 8/2015 | Kim | H04W 72/0473 370/311 |
| 2015/0257115 A1* | 9/2015 | Jokimies | H04W 60/04 455/435.1 |
| 2015/0277528 A1* | 10/2015 | Knight | G06F 1/3206 713/323 |
| 2015/0312359 A1* | 10/2015 | Okabayashi | H04W 4/028 709/203 |
| 2015/0327183 A1* | 11/2015 | Park | H04W 52/383 370/311 |
| 2015/0334656 A1* | 11/2015 | Ji | H04W 52/0245 370/252 |
| 2015/0351032 A1* | 12/2015 | Homchaudhuri | H04W 52/0235 370/311 |
| 2015/0358824 A1* | 12/2015 | Kim | H04W 4/005 726/4 |
| 2015/0373575 A1* | 12/2015 | Smadi | H04W 28/0215 370/236 |
| 2016/0007283 A1* | 1/2016 | Trainin | H04W 52/0216 370/311 |
| 2016/0057029 A1* | 2/2016 | Iida | G06Q 10/00 709/224 |
| 2016/0066273 A1* | 3/2016 | Prats | H04W 52/0229 370/311 |
| 2016/0205594 A1* | 7/2016 | Savolainen | H04W 52/0251 370/311 |
| 2016/0277870 A1* | 9/2016 | Gattami | H04W 4/005 |
| 2016/0278014 A1* | 9/2016 | Chen | H04L 67/125 |
| 2016/0330729 A1* | 11/2016 | Wei | H04W 52/244 |
| 2016/0337968 A1* | 11/2016 | Park | H04W 52/0235 |
| 2017/0019872 A1* | 1/2017 | Yang | H04W 4/08 |

* cited by examiner

COMMUNICATION OF PROCESSOR STATE INFORMATION

CROSS REFERENCE TO RELATED APPLICATIONS

The present application claims the benefit of U.S. Provisional Application No. 62/044,712, filed Sep. 2, 2014 and entitled "COMMUNICATION OF PROCESSOR STATE INFORMATION," which is hereby incorporated by reference in its entirety for all purposes.

FIELD

The present disclosure relates generally to communications between electronic devices, including communication of processor state information.

BACKGROUND

Mobile electronic devices, such as laptops, palmtops, mobile phones, smart phones, multimedia phones, portable media players, GPS units, mobile gaming systems, etc., have become quite popular. Many users carry a device almost everywhere they go and use their device for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information). A user's mobile device can be carried or worn and perform a variety of functions.

The mobile device can have a processor running applications that access a variety of content, such as phone calls, email, websites, streaming audio/video, social media, and the like. Such applications can include e-mail applications, update/upgrade applications, news applications, web applications, podcast applications, social networking applications, or the like. The mobile device can periodically receive messages for the applications from other devices, such as notifications from services that new content is available, as well as various other notifications or other types of messages. Notifications typically represent events of interest, which are typically defined by the applications (e.g., new e-mail indicator, new news item indicator, new podcast indicator, change of on-line status of a social networking friend, etc.). Frequent delivery of messages or notifications can drain the battery of the mobile device.

BRIEF SUMMARY

Embodiments are described for allowing a first device and a second device (e.g., having established a communications link with each other) to manage communications using hardware and/or software state information (e.g., on/off). For instance, the first device can include a first processor and the second device can include a second processor. The first device can record first state information when a change occurs in a state of the first processor, e.g., entering a sleep mode. The first device can further record second state information when a change occurs in a state of the second processor of the second device, e.g., using information obtained from the second device. The second device can also record a state of the second processor and a state of the first processor, e.g., using information obtained from the first device. Embodiments can manage communications using the state information, thereby reducing power consumption, e.g., due to reducing the number of inter-device messages.

The first device can use recorded state information to determine whether to perform operations, e.g., power consuming operations that involve the second device. The first device can determine a current state of the second processor in the second state information. The first device can use the current state of the second processor to determine whether to send a message to the second device over the communications link. In some embodiments, the first device can determine to queue a message for later delivery to the second device when the current state of the second processor is a sleep mode. In some embodiments, the first device can determine to send a message to the second device notwithstanding the current state of the second processor, e.g., when the message has a sufficiently high priority or satisfies one or more other criteria. Furthermore, the second device can also determine whether to perform operations that involve the first device using state information about the first processor of the first device.

In some embodiments, the first device can use the first state information to determine whether to perform operations locally that involve processing by the first processor, e.g., processing a message received from the second device. The second device can use its own state information locally to determine whether to perform operations that involve processing by the second processor.

In some embodiments, a first communications link manager of the first device can manage establishment of the communications link with a second communications link manager of the second device. The first communications link manager can manage state information on behalf of the first device. The second communications link manager can manage state information on behalf of the second device. The first communications link manager and the second communications link manager can communicate changes in the state of the first and second processors over the communications link. Each communications link manager can reduce power consumption locally when the local processors are not involved in the exchanges of state information. Furthermore, power consumption at remote devices can be reduced when a local communications link manager is aware of the state of the remote processors.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

Figure 1:
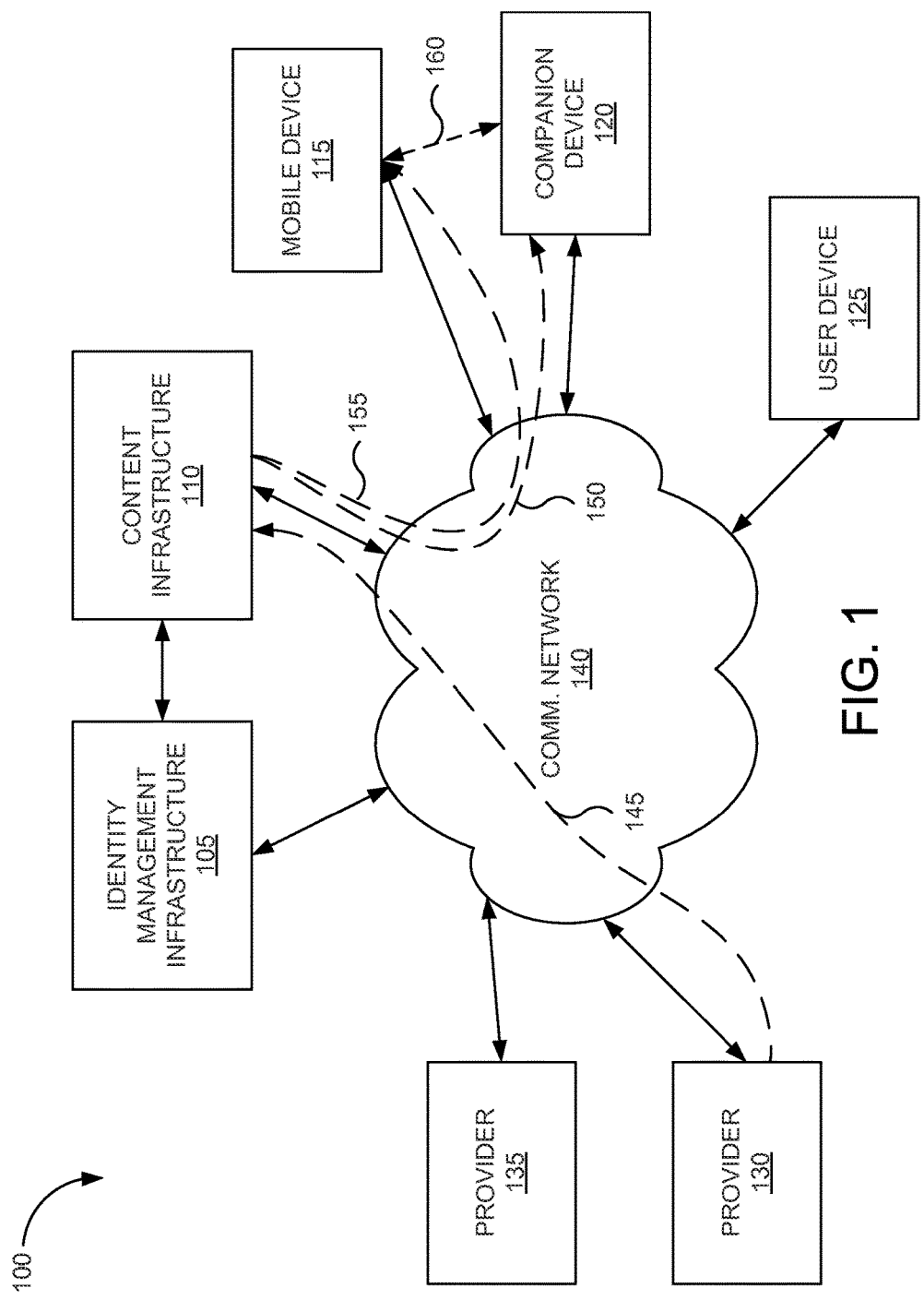
FIG. 1 is a block diagram of an example device management and content delivery ecosystem 100.

Some mobile devices (e.g., a smart watch or other wearable devices) can have a small power source (e.g., a battery) due to their physical size. These mobile devices can implement a variety of internal power management schemes to reduce power usage and extend battery life. Some other devices (e.g., smartphones, tablets, or laptops) can have larger power sources than the mobile devices. These other devices can cause power drain in the mobile devices with each operation performed with respect to the mobile devices, irrespective of the mobile devices' internal power management schemes. Thus, frequent operations by a device (e.g., a companion device owned by a same user that owns a mobile device) may rapidly deplete the power source of the mobile device and thereby decrease the usable time between charges.

In embodiments, communications between devices can be managed using state information associated with hardware and/or software components in order to reduce power consumption and to increase battery life. State information as used herein can include power states (modes of operation) of one or more hardware and/or software components of a device. A first device having a first communications interface can establish a communications link with a second communications interface of a second device. The first device can manage state information obtained from the second device and use the state information to handle communications with the second device in order to reduce power consumption at the second device and to increase battery life. The second device can similarly attempt to reduce power consumption at the first device based at least in part on managing communications with the first device using state information obtained from the first device.

The first device can store first state information when a change occurs in state of a first processor of the first device. The first device can store second state information when a change occurs in the state of a second processor of the second device, e.g., using information received from the second communications interface of the second device. In some embodiments, the first communications interface can manage storage of the first and second state information. The first device can use the first state information in order to determine whether to perform power-consuming operations that involve the first processor, such as causing the first processor to transition from a sleep mode to a non-sleep mode to process a message. In some embodiments, the first communications interface of the first device can determine whether to wake up the first processor from a sleep mode, e.g., in response to receiving a message from the second communications interface. As an example, the first communications interface can determine that the message from the second device does not require the attention of the first processor allowing the first processor to remain asleep in its last known state, thereby conserving power.

The first device can use the second state information, which includes a current state of the second processor, in order to determine whether to have the second device perform power-consuming operations, e.g., whether to process a message destined for the second device. In some embodiments, the first processor can request, from the first communications interface, the current state of the second processor, as indicated in the second state information stored by the first communications interface. Responsive to information received from the first communications interface, the first processor can determine whether to queue a message intended for the second device for later delivery. In some embodiments, the first processor can determine to send a message to the second device, notwithstanding a current power state of the first processor as indicated in the second state information, e.g., when the message has a sufficiently high priority. The sending of the message can cause the second processor to enter a power state that allows for processing messages.

Thus, the first and second devices can reduce power-consuming operations locally and remotely at the other device based at least in part on state information, thereby increasing power savings at a local and remote level. Message communication can be managed more efficiently based at least in part on the state information to prevent increases in power usage, thereby saving power, particularly for low power devices.

The terms "first device" and "second device" are used for ease of identifying the two devices, but impart no specific limitation or requirement of the devices. Thus, although this disclosure refers to a first device and a second device, the discussion is applicable to any two devices. Additionally, the terms "mobile device" and "companion device" are used to distinguish between two devices, as in some embodiments the second device (e.g., a companion device) can establish a relationship with the first device (e.g., a mobile device). The companion device and the mobile device can use the relationship to exchange processor state information (e.g., the first, second, third, and forth state information). Using processor state information received from the other device, the companion device and the mobile device can each manage when to perform operations that involve a processor (s) of the other device. Thus, the companion device and the mobile device can each improve their own power savings as well as power savings of the other device by managing when operations involving processing are to be performed.

I. Introduction

A system of devices, and their communication is first described, where the system includes at least a mobile device (e.g., the first device) and a companion device (e.g., the second device). These embodiments are helpful in later descriptions of how and when exchanging state information between the devices can be employed and the variety of reasons for the devices to manage power-consuming operations, such as the sending and processing of messages between the devices. The establishment of a relationship between the mobile device and the companion device is also described. This relationship can be helpful in later descriptions of how the mobile device and/or the companion device know with which device(s) to exchange state information.

A. Device Management and Content Delivery Ecosystem

FIG. 1 is a block diagram of example device management and content delivery ecosystem 100. FIG. 1 and other figures are illustrative of embodiments or implementations disclosed herein and should not limit the scope of any claim. One of ordinary skill in the art may recognize through this disclosure and the teachings presented herein, other variations, modifications, and/or alternatives to those embodiments or implementations illustrated in the figures. The devices in device management and content delivery ecosystem 100 can include hardware and/or software elements.

Device management and content delivery ecosystem 100 includes an identity management infrastructure 105, content infrastructure 110 (e.g., one or more servers that implement a voice/video call service, a messaging service, and/or a push notification service), mobile device 115, companion device 120, user device 125, provider 130, provider 135, and communications network 140. Identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless local area networks (WLANs), radio access network (RANs), public switched telephone network (PTSN), etc., and/or combinations of the same). Mobile device 115 can communicate directly with companion device 120 without utilizing communications network 140.

Identity management infrastructure 105 can provide management of individual entities, together with the management of their authentication, authorization, and privileges within or across device management and content delivery ecosystem 100. Identity management infrastructure 105 can be implemented using a single server computer system or may include multiple server computer systems, web servers, application servers, networks, interconnects, or the like. Identity management infrastructure 105 can provide identity management services that include technologies and services such as Active Directory, identity providers, password managers, access control providers, single sign-on (SSO) services, OAuth, security token services, or the like.

Identity management infrastructure 105 can maintain information that authenticates the identity of a managed entity (such as a user, organization, and any associated devices, resources, services, applications, or the like). Identity management infrastructure 105 can verify that an entity is who/what it claims to be using a password, biometrics (such as a fingerprint), a distinctive behavior (such as a gesture pattern on a touchscreen), challenge-response protocols, one-time passwords (OTPs), 2-way authentications, and other techniques. Identity management infrastructure 105 can manage authorization information that defines what operations an entity can perform in the context of a specific application, service, or resource. Some authorizations may be based at least part on a role, device type, application, application type, or the like associated with a managed entity. Users are granted roles often related to a particular job or job function. Identity management infrastructure 105 can also manage descriptive information about managed entities and how and by whom that information can be accessed and modified.

Identity management infrastructure 105 can create one or more digital identities for managed entities. A digital identity can include entity identifying information (personally identifiable information or PII) and ancillary information. A managed entity can have multiple digital identities and each digital identity can encompass multiple attributes. A user can have a user identifier (e.g., a phone number, e-mail, etc.) that is linked to multiple devices. In addition to the creation, deletion, and modification of digital identities, identity management infrastructure 105 can manage ancillary entity data for use by services, such as content infrastructure 110.

Identity management infrastructure 105 can receive a single user identifier, which is used to determine device identifiers for devices associated with the user identifier. During entity registration, in order to access services or resources managed by identity management infrastructure 105, one or more user identifiers and one or more unique entity (device) identifiers may be combined to generate a token (e.g., an entity or device token). In various embodiments, a token can be encrypted by applying a hashing algorithm (e.g., SHA-0, SHA-1, SHA-2, MD5, Whirlpool, or other hashing algorithms). The token generated and encrypted for an entity can remain constant. Once a token has been generated and encrypted by identity management infrastructure 105, the token can be sent back to the entity requesting registration. The entity in some aspects can then distribute the token to services or resources managed by identity management infrastructure 105 or to other third party services for a variety of purposes relating to authentication, authorization, accounting, or the like of the entity at those managed services or resources or the trusted delivery of content to the entity by the third parties.

In various embodiments, identity management infrastructure 105 can provide the management of the authentication, authorization, and privileges of a user's devices for exchanging state information between devices. Each of the user's devices (or devices of different users) can use the state information to manage power-consuming operations, both locally and at another device. A user can designate that all or some of the devices that are registered to the user with identity management infrastructure 105 participate in synchronizing state information. Therefore, designated devices can participate in learning about state changes to hardware and/or software components of themselves and each other. In some embodiments, the designated devices can use recorded state information to manage intra and inter-device communication in an effort to reduce internal power consumption as well as power consumption of the other devices.

Content infrastructure 110 can provide services for exchanging the state information between the devices. Content infrastructure 110 can provide content and/or content related services within or across device management and content delivery ecosystem 100. Content infrastructure 110 can be protected by and/or accessible to entities managed by identity management infrastructure 105. Content infrastructure 110 can be implemented in various embodiments using a single server computer system or may include multiple server computer systems, web servers, application servers, networks, interconnects, and the like.

Content infrastructure 110 can provide content to mobile device 115, companion device 120, and user device 125, as well as to other devices and entities. Examples of content include a text message, a multimedia message, image or video data, a calendar event, an audio/video call (e.g., using VOIP), a notification of new data on a remote server, or state information for managing power-consuming operations. In certain embodiments, content can originate from one or more sources managed by identity management infrastructure 105. In certain embodiments, content can be provided directly by content infrastructure 110. In some embodiments, content can originate from one or more other sources. For example, content may originate from any one of mobile device 115, companion device 120, user device 125, provider 130, and provider 135. In another example, content may be received from one or more external sources such as the Internet, cellular networks, public switched telephone networks, or the like connected to device management and content delivery ecosystem 100.

Content infrastructure 110 can route content to any or all of mobile device 115, companion device 120, user device 125, provider 130, and provider 135. Content infrastructure 110 may manage the transfer of an SMS message received from or destined to a cellular network. Content infrastructure 110 may manage the connection of a voice call received from or destined to a public switched telephone network.

In some embodiments, content infrastructure 110 can coordinate how and whether companion device 120 can act and send signals on behalf of mobile device 115 for content managed by content infrastructure 110. Companion device 120 can act and send signals on behalf of mobile device 115. In these embodiments, companion device 120 acts as a main or intermediary device and mobile device 115 acts as a proxied device.

Content infrastructure 110 also can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. Alternatively, content can be sent to only one device, e.g., to companion device 120, which may forward content, e.g., a call, to mobile device 115. When a call is being forwarded to a device, a phone number can identify which device is to receive the phone/video call, and that device can relay the call as appropriate.

In one aspect, content can include one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

Content infrastructure 110 can include push notification services that, in addition to or in the alternative of routing content, implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa, as well as provider 130 providing content to provider 135, and vice versa.

One or more server computers of content infrastructure 110 can provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification, but a target device is offline, the notification can be stored for a limited period of time, and delivered to the device when it becomes available. In some embodiments, all recent notifications for a particular application are stored. In some other embodiments, only one recent notification for a particular application is stored. For example, if multiple notifications are sent while the device is offline, each new notification can cause the prior notification to be discarded. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and/or user device 125, and server applications that provide one or more services to which the client applications can connect. Provider 130 and provider 135 may seek to notify the client applications accessible to one or more of mobile device 115, companion device 120, and user device 125 that information is available to their respective users.

In various aspects, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In some embodiments, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may each be embodied as a single device, a single computer system, multiple devices, or multiple computer systems. In various aspects, mobile device 115, companion device 120, and user device 125, although labeled differently for convenience, can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

Mobile device 115, companion device 120, and user device 125 can host one or more of a variety of client applications that communicate with one or more server applications provided by one or more providers (e.g., provider 130 and provider 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

Mobile device 115, companion device 120, and user device 125 can receive an identifier (or device token) when a client application initially connects with content infrastructure 110 in order to receive push notifications. Provider 130 and provider 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate the token, content infrastructure 110 can ensure that the device identifier contained in the token matches, e.g. corresponds to, the device identifier in a device certificate used when the device registered with identity management infrastructure 105.

In some embodiments, operations of content infrastructure 110 can be to forward or otherwise communicate content from provider 130 to companion device 120 as illustrated by path 145. Provider 130 can send an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilize the additional user-defined data to identify provider 130 in a trusted fashion. Other secure communications protocols (e.g., cryptographic protocols such as Transport Layer Security (TLS), etc.) can be used in other embodiments.

Where provider 130 is associated with a particular application and includes additional identifying (e.g., user-defined) data within the SSL certificate, identity management infrastructure 105 can authenticate provider 130 and automatically provision push services for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 can receive content from provider 130. The content may include a device token. Having received the content from provider 130, content infrastructure 110 determines the destination for the content. In various embodiments, the destination is determined based at least part on the device token that is sent along with the content. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, content infrastructure 110 can route the content to companion device 120 illustrated by path 150, for example, via a persistent connection maintained by companion device 120 with content infrastructure 110. If the destination is "offline" or otherwise inaccessible to content infrastructure 110, the content may be stored, with delivery retried at a later time. Content infrastructure 110 can in addition to or alternatively route the content to mobile device 115 illustrated by path 155, for example, via a persistent connection maintained by mobile device 115 with content infrastructure 110. Content infrastructure 110 thus can route content to a single device, multiple devices at the same time, or to one device for delivery to another device.

Mobile device 115 and companion device 120 can exchange information (e.g., state information) as illustrated by path 160. Companion device 120 can deliver, to mobile device 115, content generated by companion device 120 or content received from content infrastructure 110 on behalf of mobile device 115. Mobile device 115 and companion device 120 can exchange state information for managing power-consuming operations, such as intra and inter-device communications, in an effort to reduce internal power consumption as well as power consumption of the other device. In some embodiments, companion device 120 can manage power-consuming operations that involve mobile device 115 based at least part on state information obtained from mobile device 115, potentially improving battery life and extending usability of mobile device 115. In some embodiments, mobile device 115 can manage its own power-consuming operations based at least part on locally recorded state information, potentially improving battery life, and extending usability of mobile device 115.

B. Establishing Device Relationships

A user can designate that a mobile device (e.g., mobile device 115) and a companion device (e.g., companion device 120) participate in the exchange of state information for managing power-consuming operations. In some embodiments, the mobile device and the companion device can establish a relationship at the user's direction before (or as part of) communicating the state information between the devices. The mobile device and the companion device can have multiple relationships between the devices, as well as, relationships with other devices.

Figure 2:
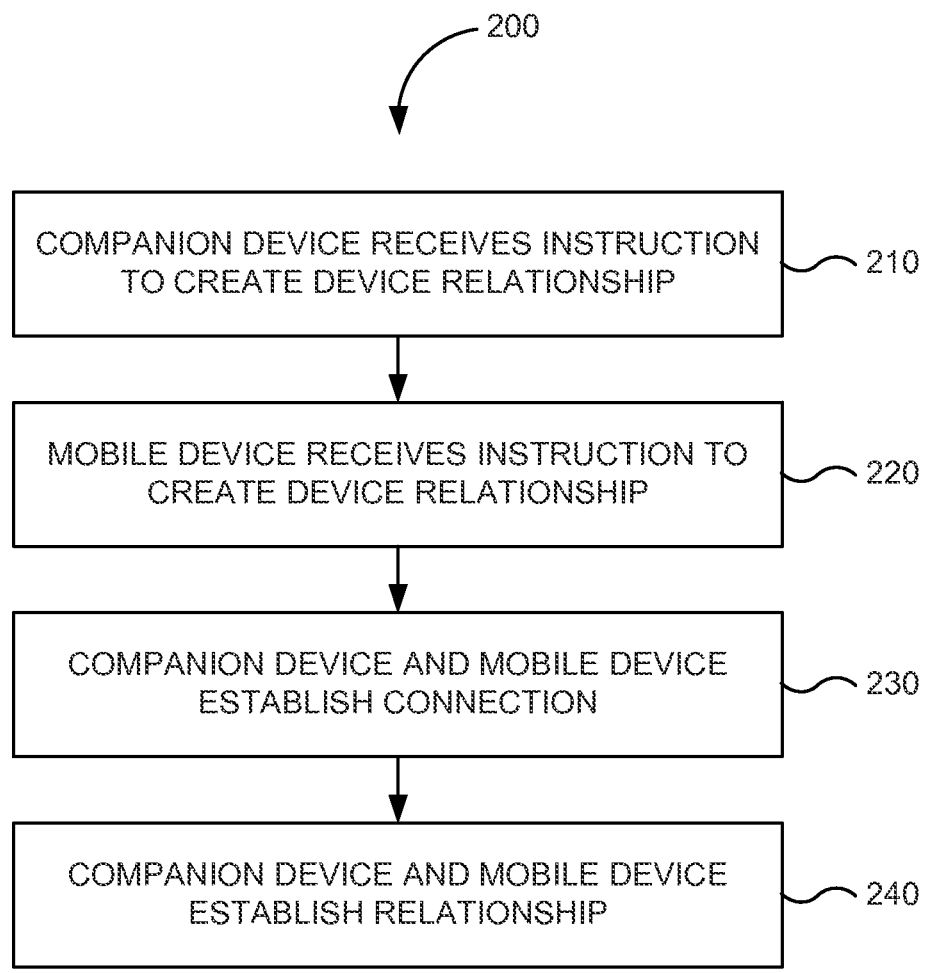
FIG. 2 is a flowchart of an example method for creation of relationships between companion devices and mobile devices.

FIG. 2 is a flowchart of example method 200 for creating relationships between companion devices and mobile devices. The relationships can be established by any interactions between the devices. In some embodiments, the mobile device and the companion device establish a pairing relationship, and use the pairing relationship to exchange the state information. Where the mobile device has a relationship with the companion device (e.g., being paired with a mobile device, configured to automatically connect to a mobile device, etc.), in some embodiments, each device can determine what type of state information to exchange, when to exchange state information, and with whom to share state information for managing power-consuming operations. As an example, the companion device can use state information, obtained from the mobile device, to determine whether to perform an operation that requires processing by a component of the mobile device. In some embodiments, the mobile device can use a change in state of the component to determine whether the component is available for performing certain power-consuming operations.

In step 210, the companion device receives one or more instructions to create a device relationship. A device relationship, as used herein, refers to a communications link between at least two devices. The communications link can be established between the two devices using a wired or a wireless connection. The communications link can be a persistent connection, where the overhead of creating and destroying individual connections between devices is avoided using at least a single connection. In addition to allowing each device to request information from the other device, the persistent connection can allow each device to "push" content to the other device. In various embodiments, a user of the companion device can provide the instruction to create the device relationship by placing the companion device into a relationship creation mode (e.g., a pairing mode). In some embodiments, firmware or software of the companion device can provide the instruction to create the device relationship, e.g., upon detecting that the mobile device is available.

In step 220, the mobile device receives one or more instructions to create a device relationship. The mobile device can receive the instruction from any source, including a user, from firmware or software, etc. In certain embodiments, the mobile device and the companion device can each implement the Bluetooth® wireless communication protocol used for exchanging data and for "device association" or "device pairing."

In step 230, the companion device and mobile device establish a connection. For example, to establish a connection, the companion device and mobile device may perform a handshake, sending and receiving a set of requests, replies, nonces, etc. During the handshake, the companion device and mobile device can establish one or more connection parameters (e.g., sequence number) for either direction of communication. After the handshake, both the companion device and mobile device can receive an acknowledgment of the connection. In some embodiments, the connection is established between the companion device and the mobile device, as each device connects to device management and content delivery ecosystem 100 of FIG. 1 using wired or wireless interfaces.

In step 240, once connected, the companion device and the mobile device establish a device relationship. In some embodiments, the companion device and the mobile device can establish the device relationship by identifying the other device as being "trusted." The companion device and the mobile device can establish the device relationship by creating parameters for trusting data sent over the connection, e.g., establishing encryption keys for the connection such that the data exchanged is protected against eavesdropping.

The companion device and the mobile device can use the device relationship to determine with whom to share information. For example, the companion device can use the device relationship to determine that the companion device is authorized to send and receive data and instructions on behalf of the mobile device. The mobile device can use the device relationship to determine that the mobile device is authorized to send and receive data using hardware and/or software capabilities of the companion device. In some embodiments, the companion device and the mobile device can use the device relationship to determine whether to participate in the exchange of state information for managing power-consuming operations. Exchanging the state information can allow each device to manage the power-consuming operations in an effort to reduce internal power consumption and/or power consumption of the other device.

Processing in method 200 and other methods described herein may be performed by software (e.g., instructions or code modules) when executed by one or more processing units (e.g., CPU, processor, or the like) of a logic machine, such as a computer system or information processing device, by hardware components of an electronic device (e.g., logic circuitry), or by combinations of software and hardware elements.

II. Device State Information Synchronization

In some embodiments, the companion device (e.g., companion device 120) can act as a facilitator to the mobile device (e.g., mobile device 115) to reduce power consumption, e.g., using state information (e.g., on/off or a mode of operation) of one or more hardware and/or software components of the mobile device. The mobile device and the companion device may be associated with the same user. These devices may communicate messages often, and thus may benefit from embodiments that use state information for improving power savings by determining how and/or when messages are to be sent between the devices or delivered internally.

In some embodiments, a first component of the mobile device and a second component of the companion device can record, or cause to be recorded, state information of hardware and/or software components of their respective devices. As an example, the first component can determine the current state or mode of operation of a first processor of the mobile device. The first component can use the determined state information to determine whether to perform a power-consuming operation that involves the first processor (e.g., processing a message received from the companion device). In some embodiments, the first component can send the determined state information to the second component of the companion device, further enabling the companion device to manage power-consuming operations that involve the first processor (e.g., sending a message to the mobile device). Each component can maintain the state information of their respective processor(s) and of the processor(s) of the other device, thereby making the stored state information later available for use in managing local power consumption and power consumption caused at the other device.

A. State Information Management

In some embodiments, a first communications link manager of the mobile device (e.g., the first component) can manage communications links between the mobile device and one or more other devices (e.g., the companion device). The first communications link manager can include wired or wireless interfaces (e.g., a first communications interface) that participate in establishing the communications links with wired or wireless interfaces (e.g., a second communications interface) of a second communications link manager of the companion device. As each communications link manager handles communication with the endpoints of the communications links, each can use a position in the communication stack of the device to manage state information at the device, both state information of the device (as local state information that can be shared over the communications links), and state information of the other device (as remote state information received over the communications links). Local and remote state information managed by each communications link manager can be used to determine whether to perform power-consuming operations, such as handling the internal delivery of messages or the sending messages over the communications links. The following description is made together with a discussion of how the first communications link manager of the mobile device and the second communications link manager of the companion device participate in the capture and management of local and remote state information.

Figure 3:
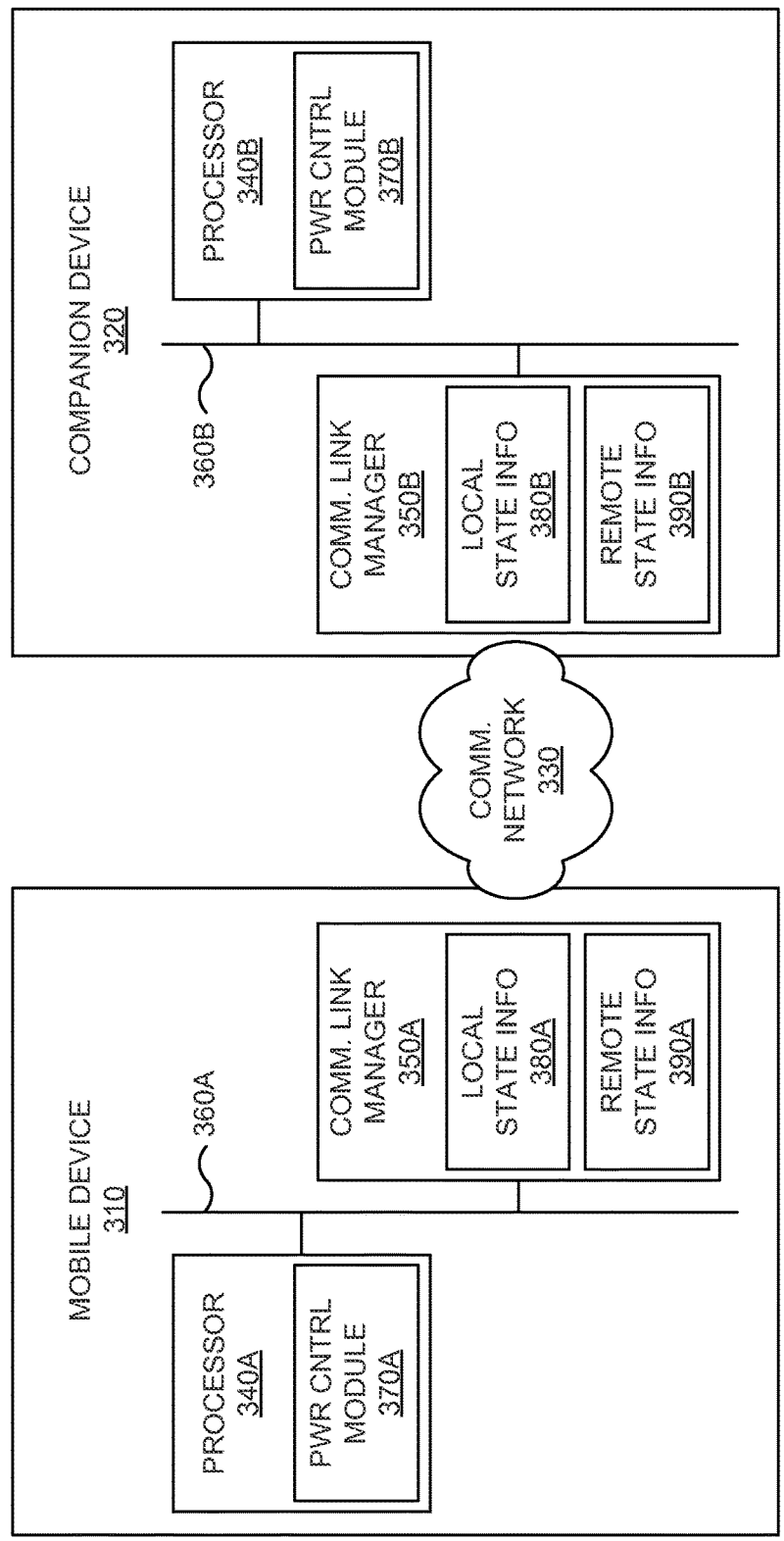
FIG. 3 is a block diagram of an example mobile device and an example companion device that manage intra-device communication and inter-device communication by exchanging hardware and/or software state information (e.g. on/off).

FIG. 3 is a block diagram of an example mobile device 310 and companion device 320 that manage intra-device communication and inter-device communication by exchanging state information. Mobile device 310 and companion device 320 can exchange the state information via communications network 330. Mobile device 310 can be any portable electronic device, including a handheld computer, a tablet computer, a mobile phone, laptop computer, tablet device, media player, personal digital assistant (PDA), a wearable device (e.g., a smart watch), a key fob, a car key, an access card, a multi-function device, a mobile phone, a portable gaming device, or the like, including a combination of two or more of these items. Although not shown, mobile device 310 can be powered by one or more internal power sources (e.g., a battery) or external power sources (e.g., an A/C adapter).

Mobile device 310 can include processor 340A and communications link manager (CLM) 350A connected by interface 360A (e.g., a system bus). Processor 340A can include one or more processors, as defined herein. Although processor 340A is used in this example, techniques disclosed herein are applicable to other hardware and/or software components. Processor 340A can include power control module (PCM) 370A.

PCM 370A can include hardware and/or software elements that manage one or more power states (modes of operation) of processor 340A. PCM 370A may also manage one or more power states of other elements of mobile device 310, such as CLM 350A. Although shown integrated with processor 340A, PCM 370A can be embodied as distinct circuitry of mobile device 310. PCM 370A can perform one or more actions to place (at least) processor 340A into a different power state, which may be a higher or lower power state than a previous power state, where a lower power state uses less energy than a higher power state. The different power states can allow different levels of processing messages, where a lower power state would typically allow less processing, with the benefit of power savings.

One power state can be a sleep mode. Sleep mode, as used herein, generally refers to a low power mode for electronic devices such as computers, televisions, and remote controlled devices. The sleep mode can disable or otherwise reduce the amount of electrical consumption of elements of mobile device 310 (such as processor 340A) compared to other power modes, such as a balanced mode (e.g., where processor 340A performs most if not all functions at a lower clock speed), a performance mode (e.g., where processor 340A performs all functions at full speed), or the like.

In some embodiments, PCM 370A causes the state of processor 340A (or of another managed component of mobile device 310) to be held in memory (e.g., RAM) and, when placed in sleep mode, PCM 370A cuts power to processor 340A (and any unneeded subsystems) and places the RAM into a minimum power state, e.g., sufficient only to retain its data. In this state, mobile device 310 still consumes some energy in order to power the RAM and to be able to respond to a wake-up event. The state of processor 340A can be represented in memory as a set of entries (records), for example, in a data structure provided by the operating system of the mobile device 310. Each entry can correspond to a component of mobile device 310 and have associated therewith information indicative of a current state of the component. In some embodiments, an entry can include a resulting state of the component, a resulting mode of operation able to perform a given operation, a reference to one of a plurality of modes of operation, or the like. In other embodiments, the entry can include one or more flags indicating that the state of the component has changed.

In further embodiments, PCM 370A causes all state information to be stored in nonvolatile storage, such as on a hard disk or in flash memory, and when placed in this sleep mode (or hibernation mode), PCM 370A may completely or partially turn off all elements of mobile device 310. When mobile device 310 is switched back on, PCM 370A can restore elements to their state prior to going to sleep, with all programs and files open, with unsaved data intact. Other power modes and hybrid combinations can be implemented by PCM 370A.

In some embodiments, the state of processor 340A (or of another component of mobile device 310) is caused to be held in memory by another component of mobile device 310, such as CLM 350A. In some embodiments, CLM 350A can include hardware and/or software elements that manage communications links between mobile device 310 and one or more other devices. The communications links may be persistent connections, where a single connection between devices is used to send and receive multiple requests/responses, as opposed to opening new connections for different request/response pairs. CLM 350A can manage the communications links over one or more wired or wireless links, which may occur via a network or in a direct peer-to-peer connection. CLM 350A can include wired circuitry that can communicate over one or more of several different types of wired networks. CLM 350A can include wireless circuitry that can communicate over several different types of wireless networks. For example, CLM 350A can include or interface with a short-range wireless transceiver (e.g., Bluetooth), a medium-range wireless transceiver (e.g., WiFi), and/or a long range wireless transceiver (e.g., (GSM/GPRS, UMTS, CDMA2000 1x/EV-DO and LTE/LTE-Advanced) each of which can be used by CLM 350A depending on the type of communication or the range of the communication.

In some embodiments, CLM 350A can include hardware and/or software elements that manage one or more power states (modes of operation) of CLM 350A. As an example, the Bluetooth protocol provides one or more sleep modes, such as hold mode, sniff mode, or park mode. Hold mode is a temporary process (e.g., 500 ms) that is typically entered into by a device when there is no need to send voice or data information to another device for a relatively long period time, and can be used to release the device from actively communicating with the other device. Sniff mode is a process of listening for specific types of commands that occur periodically (e.g., every 50 ms) between one device and another device. The sniff mode can be used to reduce the power consumption of the devices as the receiver can be put into standby between sniff cycles agreed upon between the devices. Park mode is a process of a master device temporarily deactivating a slave device and assigning communication functions to remain inactive for extended periods of time (e.g., 10 s). When the master device commands the slave device to park, the slave device can periodically wake up and look for a beacon signal from the master device. If the beacon signal contains the address of the slave device in park mode, the slave device can reactivate and again activate communication functions with the master device.

CLM 350A can manage the establishment of these communications links to the other devices for processor 340A as well as manage state information associated with processor 340A (e.g., a change to a power state associated with processor 340A) captured as local state information 380A (e.g., the first state information). Local state information as used herein refers to state information maintained by a first component of a device about a second component of the same device. Local state information 380A can include the state or mode of operation of the component, such as processor 340A, as indicated by power level, power mode, operating mode, operating settings, or the like. In some embodiments, processor 340A communicates state changes to CLM 350A either directly or using PCM 370A. In some embodiments, CLM 350A can determine state changes of processor 340A based at least part on one or more observations with respect to processor 340A, PCM 370A, or other components of mobile device 310.

In some embodiments, local state information 380A can be used to increase power efficiency locally, such as with processor 340A. As an example, CLM 350A can determine whether the current state of processor 340A in local state information 380A allows processor 340A to handle a message received over the communications link from companion device 320. CLM 350A can queue the message from companion device 320 for later deliver to processor 340A when a change to the state of processor 340A occurs allowing for processing messages.

CLM 350A can send, to the other devices, all or part of local state information 380A using the communications links to the other devices to inform the other devices of the state (e.g., power mode) of components of mobile device 310. In some embodiments, CLM 350A can communicate state information to the other devices notwithstanding the current state of a component, e.g., when processor 340A is already asleep. As an example, CLM 350A can implement a link level protocol for exchanging the local state information with the other devices. Because data exchanged at the link layer can be processed by CLM 350A without requiring processor 340A, CLM 350A can maintain up to date state information with the other devices without processor supervision.

CLM 350A can further obtain, from the other devices, state information of components of the other devices and store the state information as remote state information 390A (e.g., the second state information). Remote state information as used herein refers to state information maintained by a first component of a first device about a second component of a second device. Remote state information 390A can include state information of each device having a device relationship with mobile device 310.

In some embodiments, remote state information 390A can be used to increase power efficiency at a remote device, such as at companion device 320. As an example, processor 340A can query CLM 350A for the current state of a component of companion device 320 (e.g., processor 340B) in remote state information 390A to determine whether to send a message over the communications link to companion device 320. Processor 340A can send the message or queue the message for later delivery based at least part on the current state of processor 340B.

Companion device 320 includes processor 340B and communications link manager (CLM) 350B connected by interface 36013. Companion device 320 can be any electronic device, including a handheld computer, a tablet computer, a mobile phone, laptop computer, desktop computer, or the like, including a combination of two or more of these or the items described with respect to mobile device 310. In some embodiments, companion device 320 can be powered by one or more internal power sources (e.g., a battery) or external power sources (e.g., an A/C adapter) that deliver more power than any power source of mobile device 310.

Processor 340B of companion device 320 can operate in a similar manner as processor 340A of mobile device 310. In some embodiments, processor 340B can include circuitry not found in processor 340A that enables processor 340B to perform additional functions. Processor 340B may further include circuitry that enables processor 340B to operate a higher clock speed than all clock speeds of processor 340A. PCM 370B can operate with respect to companion device 320 in a similar manner as PCM 370A operates with respect to mobile device 310.

CLM 350B can operate with respect to companion device 320 in a similar manner as CLM 350A operates with respect to mobile device 310. As an example, CLM 350B can manage establishment of communications links to one or more other devices for processor 340B as well as manage state information associated with processor 340B captured as local state information 380B (e.g., the third state information). In some embodiments, local state information 380B can be used to increase power efficiency locally, such as with processor 340B. CLM 350B can send, to the other devices, all or part of local state information 380B using the communications links to the other devices to inform the other devices of the state of components of companion device 320.

CLM 350B can further obtain, from the other devices, state information of components of the other devices and store the state information as remote state information 390B (e.g., the fourth state information). Remote state information 390A can include state information of each device having a device relationship with companion device 320. In some embodiments, remote state information 390A can be used to increase power efficiency at a remote device, such as at mobile device 310. As an example, processor 340B can query CLM 350B for the current state of a component of mobile device 310 (e.g., processor 340A) in remote state information 390B to determine whether to send a message over the communications link to mobile device 310. Processor 340B can send the message or queue the message for later delivery based at least part on the current state of processor 340A.

As an example of managing state information, processor 340A of mobile device 310 can enter a sleep mode. CLM 350A can record the resulting state of processor 340A in local state information 380A. CLM 350A can later determine the current state of processor 340A when CLM 350A has an internal message or a message from companion device destined for processor 340A. CLM 350A can improve power savings of mobile device 310 by delaying delivery of the message until a change in the state of processor 340A allows processing the message. CLM 350A can also send the resulting state of processor 340A to companion device 320 (e.g., to CLM 350B), where it is stored in remote state information 390B.

Companion device 320 can determine the current state of processor 340A when the message is to be sent to mobile device 310 and improve power savings of mobile device 310 by queuing the message for later delivery when a change in the state of processor 340A allows processing the message. Companion device 320 can use a resulting state of processor 340B stored in local state information 380B when an operation is to be performed with respect to processor 340B improving internal power savings by delaying performance of the operation until a change in the state of processor 340B allows the operation.

B. State Information Synchronization

The mobile device and companion device can exchange state information at various times and in various forms. As an example, in response to a change in state that occurs to the first processor of the mobile device, the mobile device can determine when to send the change in the state of the first processor to the companion device. In some embodiments, the mobile device can determine whether to send a state change immediately to the companion device or whether to delay delivery of the state change. In some embodiments, the mobile device can generate a message having one or more flags indicative of a resulting state of the first processor. The mobile device may send a value indicative of a mode of operation or a message simply indicating that there has been a state change.

Figure 4:
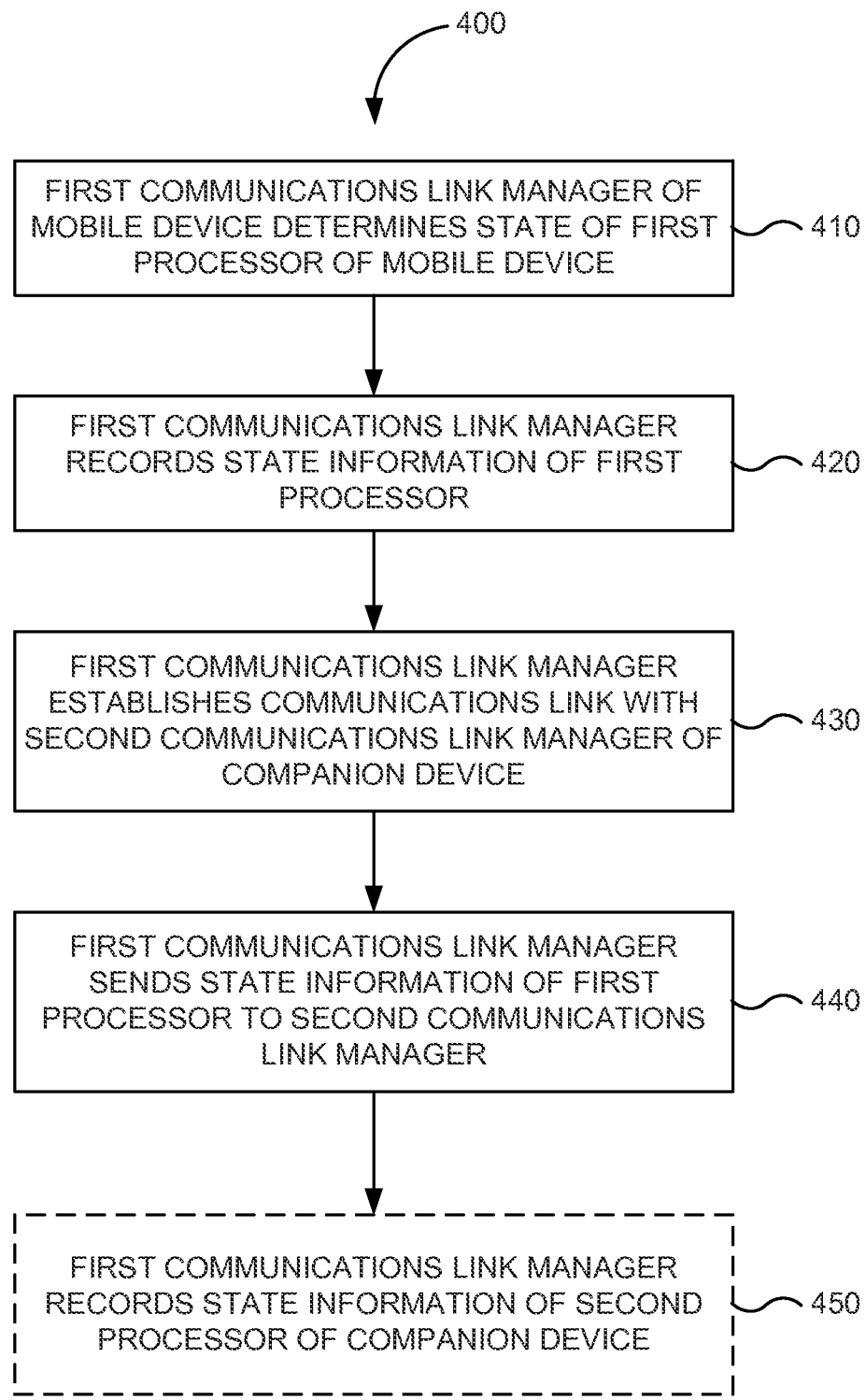
FIG. 4 is a flowchart of an example method for synchronizing processor state information from the mobile device to the companion device.

FIG. 4 is a flowchart of an example method 400 for synchronizing processor state information from the mobile device (e.g., mobile device 310) to the companion device (e.g., companion device 320). Some of the example methods described herein, such as method 400, are described as being implemented by the mobile device. Additionally, some methods are described as being implemented by the companion device. Unless otherwise indicated, each of the herein example methods can readily be implemented by either or both devices. The mobile device and the companion device can each take on the role of the first device and/or the second device.

In step 410, the first communications link manager of the mobile device determines the state of a first processor of the mobile device. The determined state of the first processor can be structured or unstructured data indicative of a status or mode of operation of the first processor. The first communications link manager can determine the state of the first processor from another component of the mobile device or through observation, such as in response to a periodic polling of processor state. In some embodiments, the first communications link manager can determine the state of the first processor by receiving information that directly specifies a current state of the first processor. In some embodiments, the first communications link manager can determine the state of the first processor by receiving one or more messages sufficient to provide an indication of the state of the first processor.

In some embodiments, the first communications link manager can determine the state of the first processor in response to an event. The first communications link manager can determine the state of the first processor in response to receiving, from the first processor, an instruction to perform an operation, such as to send a message over the communications link with the companion device. The communications link manager can infer the status or mode of operation of the first processor from messages, instructions, or operations triggered by the event.

In step 420, the first communications link manager records state information of the first processor. The first communications link manager can record the state information of the first processor as a set of entries or records, for example, in a data structure provided by the operating system of the mobile device. The communications link manager can store the state information of the first processor, for example, in volatile or non-volatile memory associated with the first communications link manager. The first communications link manager can represent the state information of the first processor using one or more data structures, tables, list, or the like.

In some embodiments, the first communications link manager can maintain a mapping between an identifier of a component of the mobile device (e.g., a processor identifier of the first processor) and one or more predefined states. The predefined states can be indicative of whether the processor is available for interaction while in a given state. The mapping can be stored by the first communications link manager in a local memory.

In step 430, the first communications link manager establishes a communications link with a second communications link manager of the companion device. The communications link may be a persistent or intermittent connection. In some embodiments, the first communications link manager can establish a single connection with the second communications link manager and use the connection to send and receive multiple requests/responses. The first communications link manager can maintain the connection with the second communications link manager even when the first processor enters a power state or mode of operation that does not allow for processing messages received over the connection. The first communications link manager can continue to use the connection when the processor wakes up, for example.

In step 440, the first communications link manager sends the state information of the first processor to the second communications link manager. The first communications link manager can send one or more packets, frames, datagrams, or other data representations of the state information of the first processor to the second communications link manager. In some embodiments, the first communications link manager can send a resulting state of the first processor. In some embodiments, the first communications link manager can send an indication that the first processor has been (or is about to be) placed into a certain power state. The first communications link manager can send all or part of the state information of the first processor to the second communications link manager. In some embodiments, the first communications link manager can send only the changes that have occurred since the last update with the second communications link manager.

Thus, the first communications link manager can keep the second communications link manager informed of the current state of the first processor. Any state information stored by the second communications link manager about the first processor can be used to reduce operations that require processing by the first processor, which can result in an increase in power savings at the mobile device. The second communications link manager can more efficiently manage message communication from the companion device to the mobile device to prevent increases in power usage at the mobile device due to uncoordinated message processing.

In optional step 450, the first communications link manager can record remote state information of a second processor of the companion device. The first communications link manager can receive information from the second communications link manager that conveys the state information of the second processor in the formats described above. In some embodiments, the first communications link manager can infer the state of the second processor based at least part on the communications link. As an example, when establishment of the communications link is made using a certain set of link parameters, such as a low-power mode or a keep-alive mode, the first communications link manager can record that the second processor is in a power reduced or sleep mode state.

Therefore, the first communications link manager can remain informed by the second communications link manager of the current state of the second processor. This can similarly result in reduced power consumption at the mobile device as the state information stored by the first communications link manager can be used to reduce operations that require processing of the second processor. The first communications link manager can more efficiently manage message communication from the mobile device to the companion device to prevent increases in power usage due to sending messages that the second processor may not be available to handle.

C. Managing Processing Using Local State Information

The first communications link manager of the mobile device can use the local state information to manage operations that involve the mobile device (e.g., processing by the first processor). As an example, in addition to duties performed to manage establishment of the communications links of the mobile device, the first communications link manager can use the local state information to determine whether to perform a power-consuming operation that involves the first processor. Using a current state of the first processor indicated in the local state information, the first communications link manager can limit internal message communication to conserve power.

Figure 5:
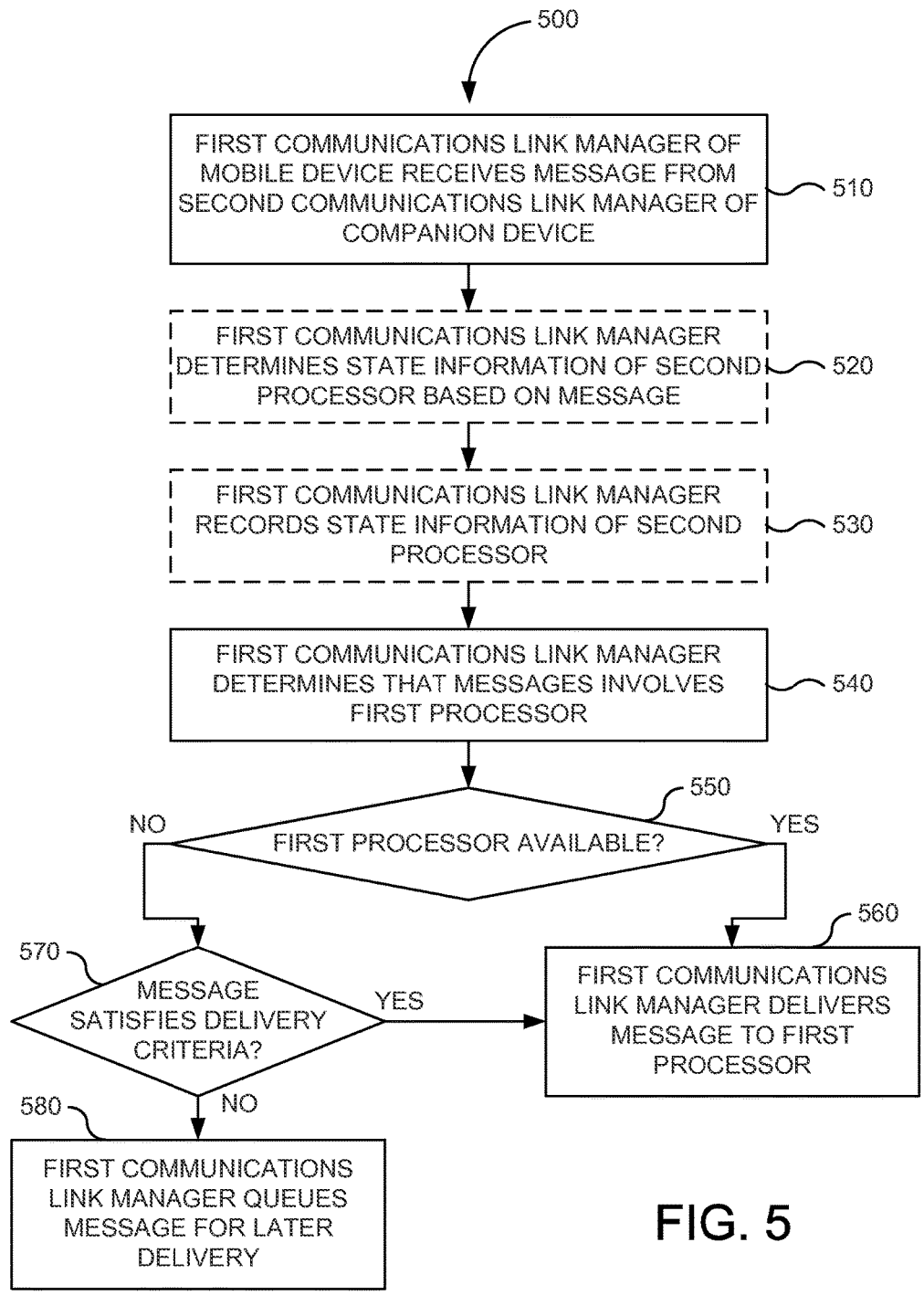
FIG. 5 is a flowchart of an example method of a mobile device using local processor state information in processing a message received from a companion device.

FIG. 5 is a flowchart of an example method 500 of a mobile device using local processor state information in processing a message received from a companion device. Message communication management using local state information maintained by the first communications link manager can extend the time between recharges of a power source of the mobile device. Battery life can be improved by reducing the frequency of when the first processor transitions from a sleep mode to enter a power mode suitable to handle a message destined for the first processor.

In step 510, the first communications link manager of the mobile device receives a message from the second communications link manager of the companion device. The first communications link manager and the second communications link manager can manage their end of the communication link using a wired or wireless interface to exchange the message. The message can include any type of message exchanged between the two devices, such as a message to establish the communications link, a message to close the communications link, a message containing data requested by the mobile device from an application of the companion device, a link-level protocol message, or the like.

In some embodiments, the first communications link manager can receive a message as data requested by an application of the mobile device. In some embodiments, the first communications link manager can receive a message as data to be handled by the first processor in addition to one or more state information updates about the companion device. In some embodiments, the first communications link manager can receive the message as an individual state information update about the companion device.

The first communications link manager can receive a state information update to expressly inform the first communications link manager of the state of the second processor of the companion device. The first communications link manager can process the state information update in the message to record the state of the second processor without forwarding the message to the first processor. State information received by the first communications link manager can take various forms, such as a resultant power state, an indication to switch between two states, or a value that maps to a particular state or mode of operation. The first communications link manager can receive a message specifying a reduction or increase in a current state by a specified number of levels. In some embodiments, the message can be indicative of the status or mode of operation of a plurality of components of the companion device that includes the second processor. The first communications link manager can process the message with or without delivering the message to the first processor to record the state of the second processor.

The processing shown in steps 520 and 530 is optional, and is provided to enhance understanding of later discussions of managing power-consuming operations with respect to the companion device using state information that is maintained by the first communications link manager. Method 500 can proceed to step 540 without the first communications link manager processing the message to determine and record the state of the second process of the companion device.

In optional step 520, the first communications link manager determines state information of the second processor based at least part on the message. In some embodiments, the first communications link manager can determine the state information based at least part on the message by extracting one or more values from the message that are indicative of a current state of the second processor. The first communications link manager may process the message to determine a reference to a particular state or mode of operation. The first communications link manager may process the message to determine how much of a reduction or increase in level is to be applied to a recorded state of the second processor. The first communications link manager may process the message to determine an instruction to change from one state to another when there are just two available states.

In some embodiments, the first communications link manager can determine the state information based at least part on the message by inferring the state of the second processor from the message. The first communications link manager may infer a current state of the second processor from the type of message and/or the content of the message. The first communications link manager may infer that a message that does not contain state information updates about the second processor indicates that the second processor is operating in a mode suitable for processing return messages.

In optional step 530, the first communications link manager records the state information of the second processor. The first communications link manager can record one or more values indicative of a current state of the second processor. The first communications link manager may record a reference to a particular state or mode of operation. The first communications link manager may record a level resulting from a reduction or increase in level applied to a recorded level of the second processor. The first communications link manager may record the state opposite from the presently recorded state when there are just two available states.

In step 540, the first communications link manager determines that the message involves the first processor. In some embodiments, the first communications link manager can determine that the message involves the first processor based at least part on a protocol used to deliver the message, an identifier in the message of a port or address, header information associated with the message, a type of the message, content of the message, or the like. The first communications link manager may determine that the message involves the first processor when the message requires some form of processing, such as encryption, decryption, encoding, decoding, formatting, or the like. Not all messages may involve the first processor, e.g., messages that communicate state information updates between communications link managers, link-level protocol messages, or the like.

In step 550, the first communications link manager determines whether the first processor is available (e.g., in a suitable power state to process the message). A suitable power state can be one that exceeds a threshold. For example, a processor can have various power states that are non-sleep modes, with varying levels of power usage. For instance, a sleep mode can be represented as 0, and the non-sleep modes as 1, 2, or higher. The threshold can test whether the first processor is in any non-sleep mode, e.g., when the threshold is 0.

The first communications link manager can use state information of the first processor to determine whether the first processor is available. As an example, the first communications link manager can determine whether the first processor is available from processor state information maintained by the first communications link manager. The processor state information can indicate a current power state or mode of operation of the first processor. The first communications link manager can determine whether the current state of the first processor allows the first processor to handle the message. In some embodiments, the first communications link manager can determine whether the first processor is available by querying the first processor or a power control module of the first processor for a current state.

When the first communications link manager determines that the first processor is available, in step 560, the first communications link manager delivers the message to the first processor. The first communications link manager can deliver the message for direct processing by the first processor. In some embodiments, the first communications link manager can deliver the message to another component of the mobile device for further handling in conjunction with the first processor. In some embodiments, the first communications link manager can provide one or more notifications to the first processor that the message is available for processing. The first communications link manager may store the message at a certain location in memory. The first communications link manager may then provide, to the first processor, the address of the message in memory, allowing the first processor to retrieve the message.

In some embodiments, the first communications link manager can deliver a change in state of the second processor of the second device to the first processor, when the first processor is available. The first processor can locally store (cache) changes in state of the second processor having been pushed from the second device. In some embodiments, this can reduce latency where the first communications link manager does not have to be later queried by the first processor to determine a current state of the second processor.

In step 570, the first communications link manager can determine whether the message satisfies one or more delivery criteria, when the first communications link manager determines that the first processor is not available. The first communications link manager can determine whether the message satisfies the delivery criteria based at least part on a priority that exceeds a certain threshold (e.g., a sufficiently high priority), one or more message attributes, a type of the message, a protocol associated with the message, content of the message, or the like. The first communications link manager can employ processing of a set of rules having the delivery criteria as rule conditions and having one or more actions indicative of how to handle delivery of the message when the rule conditions are met. Therefore, in some embodiments, the first communications link manager can determine to deliver the message to the first processor, notwithstanding the current availability of the first processor, when the message satisfies the delivery criteria.

In some embodiments, the first communications link manager can determine to delay delivery of the messages based at least part on the determined availability of the first processor and the delivery criteria, thereby conserving power when processing is not immediately needed. When the first communications link manager determines that the message satisfies the delivery criteria, method 500 continues in step 560, where the first communications link manager delivers the message to the first processor. In some embodiments, the first communications link manager delivers the message to the first processor to cause the first processor to transition from the determined state to enter another state suitable to handle the message.

When the first communications link manager determines that the message fails to satisfy the delivery criteria, in step 580, the first communications link manager can queue the message for later deliver to the first processor. The first communications link manager can store the message in a local buffer, and attempt to deliver the message to the first processor when a change in state occurs making the first processor available for processing the message. The first communications link manager can store the message in a memory and send the address of the message in memory to the first processor when a state change occurs making the first processor available for processing the message. In some embodiments, the first communications link manager can record reception of the message in a log and thereafter discard the message. When the first processor becomes available, the first communications link manager can provide the log of discarded messages to the first processor. The first processor can request re-transmission of the messages identified in the log.

Accordingly, the first communications link manager can manage, based at least part on local state information, message communication to improve battery life performance at the mobile device. The first communications link manager can determine to queue a message for later delivery when the first processor is unavailable to process the message and the message is determined not to satisfy the delivery criteria. In some embodiments, the first processor can handle the messages in the queue in one context later as opposed to switching contexts each time an individual message is received, which can be computationally expensive operations requiring more power. The first communications link manager can manage operations based at least part on the state information and potentially extend the time between recharges of a power source of the mobile device. The first communications link manager can potentially improve battery life by reducing the frequency, based at least part on the state information, of when the first processor transitions from a sleep mode to enter a power mode suitable to handle a message.

D. Message Interaction for Managing Processing Using Remote State Information

Figure 6:
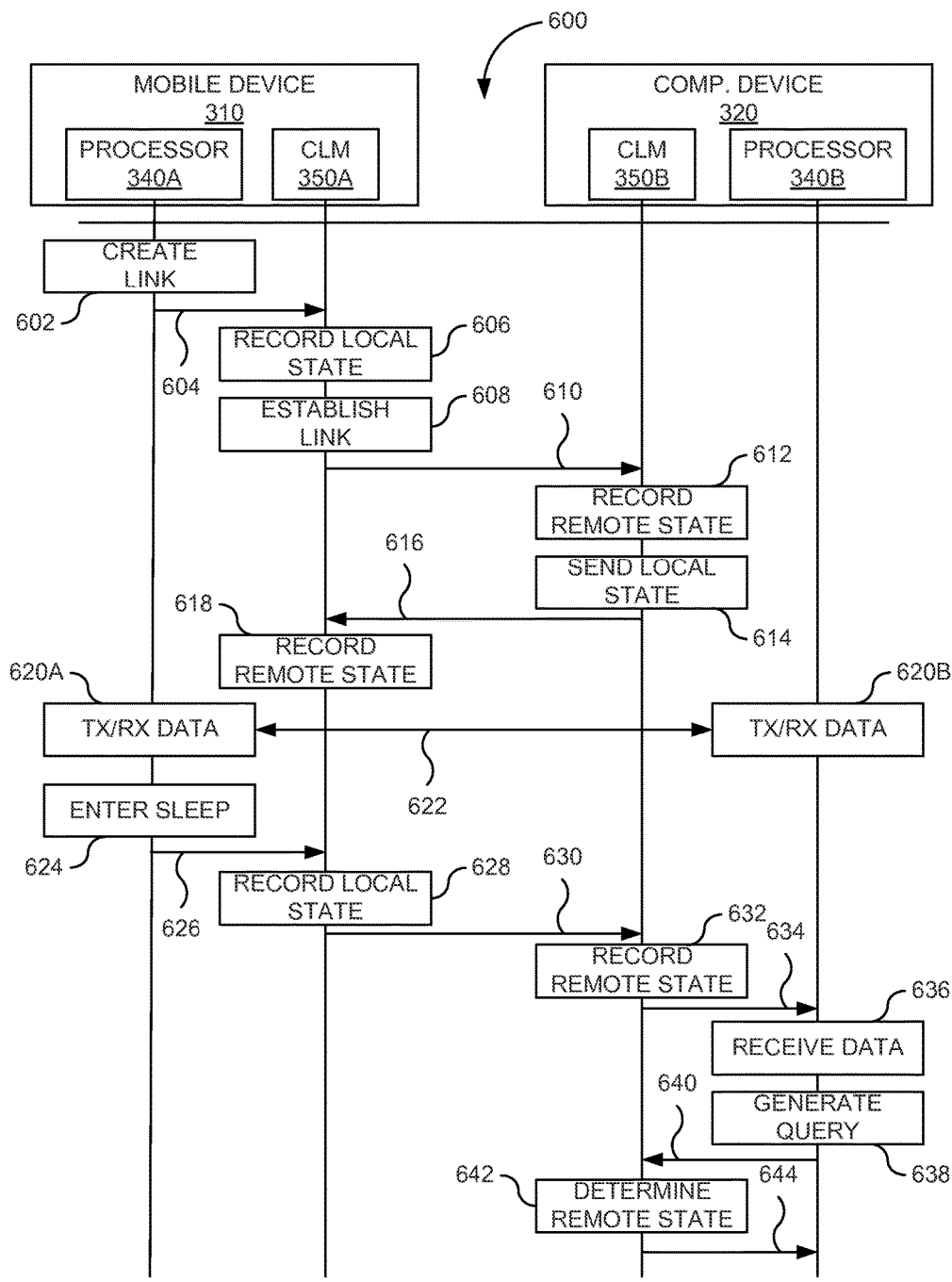
FIG. 6 is an example message sequence chart illustrating message interactions between a mobile device and a companion device to manage state information.

FIG. 6 is an example message sequence chart 600 illustrating message interactions between a mobile device and a companion device to manage processor state information.

Message sequence chart 600 describes interactions that involve messages sent by CLM 350A and CLM 350B of FIG. 3 internally with their respective processors (e.g., processor 340A and processor 340B). Message sequence chart 600 further describes interactions that involve messages sent between CLM 350A and CLM 350B.

At block 602, processor 340A of mobile device 310 creates a communications link (or link) with companion device 320. Processor 340A can generate a "create link" instruction and send the instruction to CLM 350A as represented by arrow 604. In some embodiments, processor 340A can perform one or more operations resulting in information being received at CLM 350A as represented by arrow 604. The received information can be used by CLM 350A to manage establishment of the communications link.

At block 606, CLM 350A records the local state of mobile device 310. CLM 350A can record the current state of mobile device 310, including processor state information of processor 340A. CLM 350A can update a state mapping maintained for processor 340A, e.g., changing an indicated power state from a sleep mode to a non-sleep mode. CLM 350A can update a timestamp for the current state of processor 340A indicating that the current state is effective as of the timestamp. In some embodiments, a processor can have multiple non-sleep modes (power states), with varying levels of power usage.

At block 608, CLM 350A establishes a communications link with CLM 350B of companion device 320. CLM 350A may negotiate one or more link parameters with CLM 350B in order to establish the communications link. In some embodiments, CLM 350A can send state information (e.g., the state of processor 340A) as one of the link parameters. Thus, CLM 350A can either directly or indirectly indicate the current state of mobile device 310, in one or more communications to CLM 350B as represented by arrow 610.

In block 612, CLM 350B records the remote state of mobile device 310. CLM 350A can record the current state of mobile device 310, including the processor state information of processor 340A. In some embodiments, CLM 350B can update a state mapping maintained for processor 340A. In some embodiments, CLM 350B can update a timestamp for the current state of processor 340B indicating that the current state is effective as of the timestamp.

In block 614, CLM 350B sends the local state of companion device 320 to CLM 350A. CLM 350B can send the local state of companion device 320 during the process to negotiate the link parameters with CLM 350A. In some embodiments, CLM 350B can send state information (e.g., the state of processor 340B) as one of the link parameters. Thus, CLM 350B can either directly or indirectly indicate to CLM 350A the current state of companion device 320, as represented by arrow 616. In block 618, CLM 350A records the remote state of companion device 320. CLM 350A can record the remote state of companion device 320, including the processor state information of processor 340B.

In some embodiments, when both processor 340A and processor 340B of companion device 320 are operating in a state different from a sleep state, mobile device 310 and companion device 320 can communicate over the established link by sending (TX) and receiving (RX) data as indicated in blocks 620A and 620B, and the bidirectional arrow 622 in-between. At block 624 in the sequence, processor 340A enters a sleep mode, thereby entering a reduced power state making processor 340A unavailable for sending/receiving messages. Processor 340A can send a message to CLM 350A that processor 340A is going to sleep as represented by arrow 626. At block 628, CLM 350A records the change to the local state. CLM 350A can also communicate the change to the local state to CLM 350B. CLM 350A can send a message indicating that processor 340A has entered a sleep state as represented by arrow 630. At block 632, CLM 350B records the remote state of mobile device 310.

In some embodiments, CLM 350B can send the remote state of mobile device 310 to processor 340B, e.g., when processor 340B is not asleep, as represented by arrow 634. Processor 340B can store the remote state of mobile device 310 in a local memory. This can reduce latency by not requiring processor 340B to query CLM 350B for a current state of mobile device 310. CLM 350B can use the local state of processor 340B to reduce power drain.

CLM 350B can use the remote state of mobile device 310 to reduce power drain at mobile device 310. As an example, at block 636, processor 340B receives data that is to be communicated to mobile device 310. At block 638, processor 340B generates a query requesting the remote state of mobile device 310. Processor 340B can send the query to CLM 350B as represented by arrow 640. At block 642, CLM 350B determines the remote state of mobile device 310. If the remote state of mobile device 310 is available, CLM 350B sends a response to the query from processor 340B, as represented by arrow 644, that includes the remote state of mobile device 310.

This also allows processor 340B to reduce power drain locally using the remote state of mobile device 310 by determining not to send the data to mobile device 310 because processor 340A is in a sleep mode. Processor 340B can preempt power-consuming transmissions, using the remote state of mobile device 310, which may not be received by mobile device 310. Processor 340B can further reduce power drain at mobile device 310, because processor 340A is in a sleep mode, by determining not to send the data to mobile device 310 causing processor 340A to use power processing the message.

E. Managing Processing Using Remote State Information

The second communications link manager of the companion device can maintain remote state information for managing power-consuming operations that involve the mobile device (e.g., processing by the first processor). As an example, in addition to duties performed to manage establishment of the communications links of the companion device, the second communications link manager can provide a current state of the first processor in the remote state information to the second processor for determining whether to send a message to the mobile device. In some embodiments, the second processor can limit message communication to conserve power at the mobile device based at least part on the current state of the first processor in the remote state information.

Figure 7:
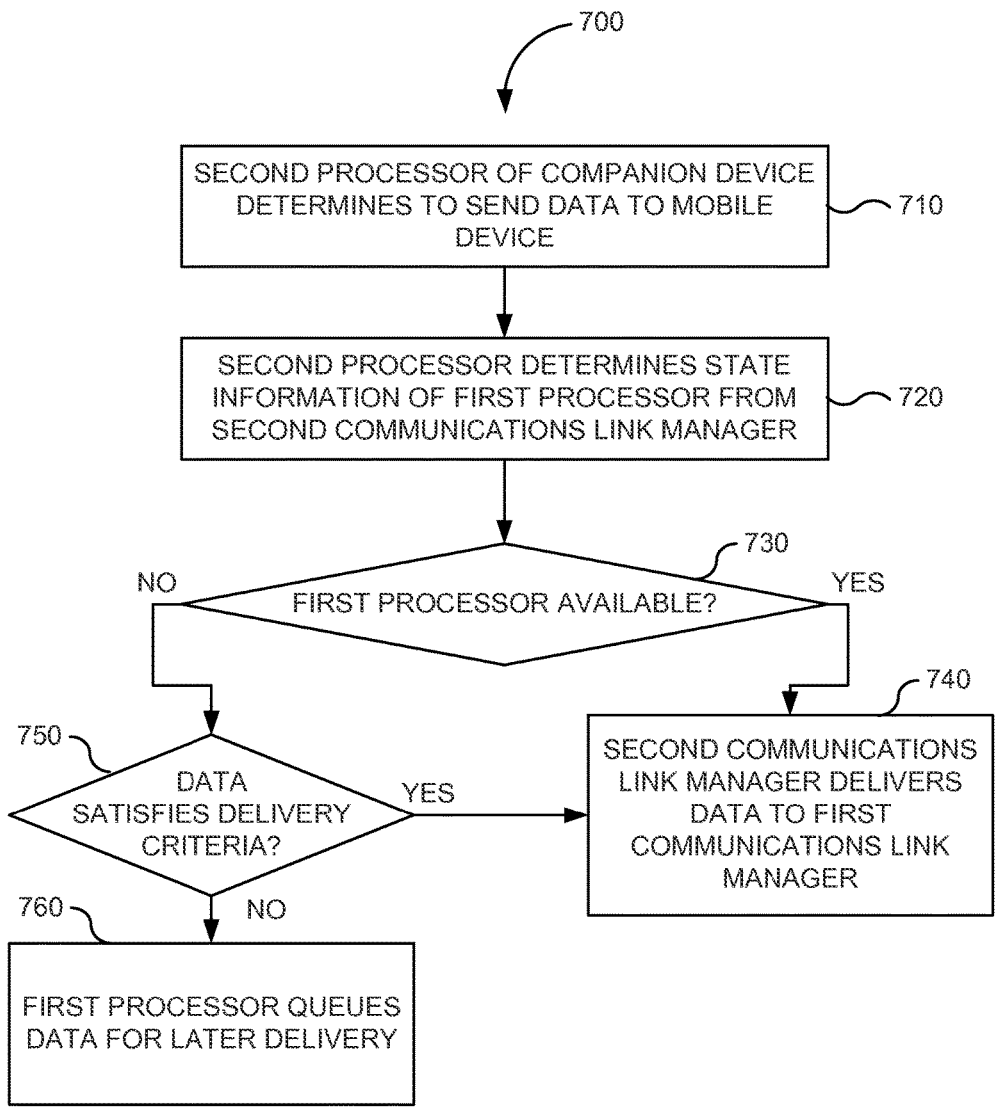
FIG. 7 is a flowchart of an example method of a companion device using remote processor state information of a mobile device in processing a message to be delivered to the mobile device.

FIG. 7 is a flowchart of an example method 700 a companion device using remote processor state information of a mobile device in processing a message to be delivered to the mobile device. The remote state information maintained by the second communications link manager can be used in various ways to extend the time between recharges of a power source of the mobile device. As an example, the remote state information can enable the second processor to reduce the frequency of when the first processor transitions from a sleep mode to enter a power mode suitable to handle a message sent by the companion device.

In step 710, the second processor of the companion device determines to send data to the mobile device. The data can include any type of data exchanged between the two devices. In some embodiments, the second processor can determine to send a response to a request made by the mobile device. The second processor can determine to send notifications to the mobile device, where the notifications were received at the companion device on behalf of the mobile device.

In step 720, the second processor determines state information of the first processor from the second communications link manager. State information can take various forms, such as a resultant power state, an indication to switch between two states, or a value that maps to a particular state or mode of operation. The second processor can determine the current state of the first processor from the remote state information maintained by the second communications link manager about the mobile device. The second processor can determine the current state of the first processor by querying the second communications link manager. In some embodiments, the second communications link manager can provide to the second processor one or more values indicative of a current state of the first processor. In some embodiments, the second communications link manager can provide to the second processor a reference to a particular state or mode of operation.

In step 730, the second processor determines whether the first processor is available (e.g., in a suitable power state to process the data). The second processor can determine that the first processor is available because the current state of the process provided by the second communications link manager indicates a power state or mode of operation indicative of whether the first process can handle the data. In some embodiments, the second processor can determine that a reference to a particular state or mode of operation of the first processor does not allow the first processor to process messages.

In step 740, the second communications link manager delivers the data to the first communications manager of the mobile device, e.g., using one or more messages, when the second processor determines that the first processor is available. The second communications link manager can provide one or more notifications to the first communications link manager that the data is available for processing. The first communications link manager can then request the data from the companion device. The first communications link manager can manage internal delivery of the data to the first processor as discussed with respect to FIG. 5.

In some embodiments, the second processor can manage message communication that causes power consumption at the mobile device based at least part on the determined availability of the first processor, e.g., sending data that satisfies the delivery criteria notwithstanding the current state of the first processor and delaying delivery data that fails to satisfy the delivery criteria thereby preventing further power consumption.

In step 750, the second processor can determine whether the data satisfies one or more delivery criteria when the second processor determines that the first processor is not available. The second processor can determine whether the message satisfies the delivery criteria based at least part on a priority that exceeds a certain threshold (e.g., a sufficiently high priority), one or more data attributes, a type of the data, a protocol associated with sending the data, content of the data, or the like. The second communications link manager can employ processing of a set of rules having the delivery criteria as rule conditions and having one or more actions indicative of how to handle delivery of the message when the rule conditions are met.

When the second processor determines that the data satisfies the delivery criteria, method 700 continues in step 740, where the second communications link manager delivers the data to the first communications link manager. In some embodiments, delivery of the data to the first communications link manager causes the first processor to transition from the determined state to enter another state suitable to handle the data.

In step 760, the second processor can queue the data for later deliver to the first processor when the second processor determines that the data fails to satisfy the delivery criteria. The second processor can store the message in a local buffer and attempt to deliver the data to the first processor when a change in state occurs making the first processor available for processing the message. The second processor can store the data in a memory and send an address (link) of the data to the first processor when a state change occurs putting the first processor into a data processing mode for processing the message. The first processor can then request deliver of the data identified by the address.

Accordingly, the second processor (or the second communications link manager) can manage message communication based at least part on remote state information. The second processor can improve battery life performance at the mobile device by determining to queue some messages for later delivery when the first processor is unavailable to process the messages. The companion device can therefore extend the time between recharges of a power source of the mobile device. Battery life can be improved by reducing the frequency of when the first processor transitions from a sleep mode to enter a power mode suitable to handle a message destined for the first processor.

F. Coordination of Processing Using Managed State Information

In some embodiments where the mobile device has a portable power source (e.g., a battery), the mobile device can implement a variety of internal power management schemes to reduce power usage and extend battery life. The mobile device can place some or all components (e.g., the first processor and the first communications link manager) in a sleep mode to conserver power. At times, the first processor can enter a sleep mode while the first communications link manager remains operational and vice versa. Thus, the timing of when particular components transition from one state to another and how long each may be in a certain state can be used to coordinate processing at the mobile device, as well as at the companion device.

Figure 8:
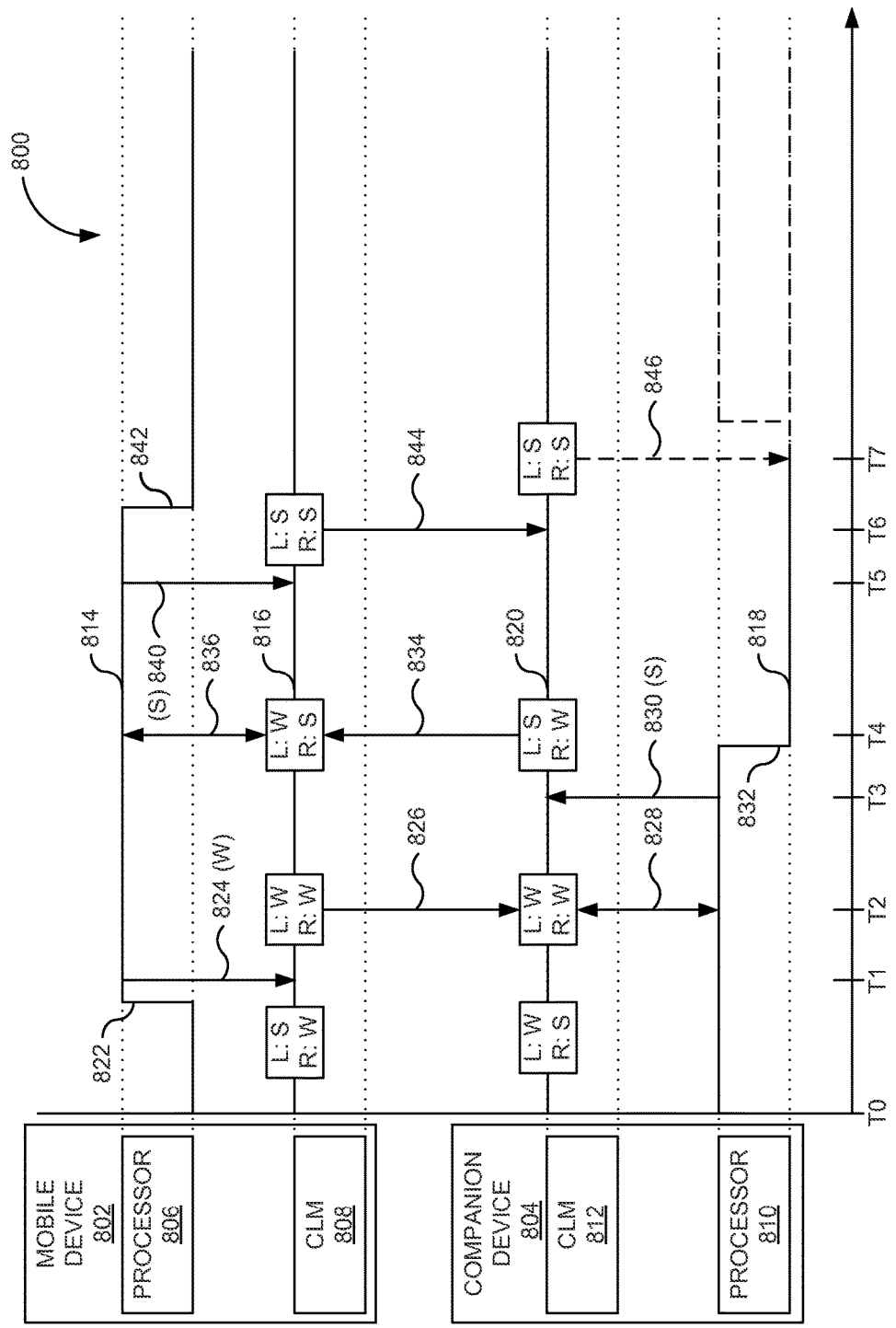
FIG. 8 is a flow diagram indicating an example time-based view of interactions between a mobile device and a companion device being coordinated using processor state information stored at each device.

FIG. 8 is a flow diagram indicating an example time-based view 800 of interactions between a mobile device (e.g., mobile device 802) and a companion device (e.g., companion device 804) being coordinated using processor state information stored at each device. Having established a communications link, mobile device 802 and companion device 804 can exchange state information via the communications link. Mobile device 802 can be any portable electronic device, including a handheld computer, a tablet computer, a mobile phone, laptop computer, tablet device, media player, personal digital assistant (PDA), a wearable device (e.g., a smart watch), a key fob, a car key, an access card, a multi-function device, a mobile phone, a portable gaming device, or the like, including a combination of two or more of these items. Mobile device 802 can include processor 806 and communications link manager (CLM) 808. Companion device 804 can include processor 810 and communications link manager CLM) 840B. Companion device 804 can be any electronic device, including a handheld computer, a tablet computer, a mobile phone, laptop computer, desktop computer, or the like, including a combination of two or more of these or the items described with respect to mobile device 802.

At time T0, processor 806 is in a sleep mode, which is indicated along waveform 814 by a dark line along the bottom of two dotted lines projected from processor 806. For each processor, the top (upper) dotted line represents a non-sleep mode (e.g., a full or balanced power mode suitable to perform processing) and the bottom (lower) line represents a sleep mode (e.g., a power-reduced mode not suitable for processing). Although not shown to transition along waveform 816 between power states, CLM 808 may enter into a sleep mode between communication functions in order to conserve power. For each communications link manager, the top (upper) dotted line represents a non-sleep mode, and the bottom (lower) line represents a sleep mode. Processor 810 of companion device 804 is in a non-sleep mode at time T0, which is indicated along waveform 818 by a dark line along the top of two dotted lines projected from processor 810. Although not shown to transition along waveform 820 between power states, CLM 812 may similarly enter into a sleep mode between communication functions in order to conserve power.

CLM 808 of mobile device 802 can store state information in memory (e.g., RAM or another memory device accessible to CLM 808). CLM 808 can store the state information used by mobile device 802 as local state information (L) and remote state information (R). The local state information can reference one or more states of components of mobile device 802. The remote state information can reference one or more states of components of other devices, e.g., those having a communications link with mobile device 802.

In one embodiment, CLM 808 can store an indication of a current status of processor 806 in the local state information. For example, CLM 808 can store information indicating processor 806 is in the sleep mode (S). In the example, (L: S) represents a state information mapping locally maintained by CLM 808 specifically for processor 806. "L" can have a value indicative of the last change in state of processor 806 such as S (sleep), representing that the last state change of processor 806 was to go to sleep, or W (wake), representing the last state change of processor 806 was to wake up. CLM 808 can also store an indication of a current status of processor 810 in the remote state information. For example, CLM 808 can store information indicating that processor 810 is in the non-sleep mode (W). In the example, (R: W) represents a state information mapping locally maintained by CLM 808 specifically for processor 810. "R" can have a value indicative of the last change in state of processor 810, such as S (sleep), representing that the last state change of processor 810 was to go to sleep, or W (wake), representing the last state change of processor 810 was to wake up.

CLM 812 of companion device 804 can store state information in memory (e.g., RAM or another memory device accessible to CLM 812). CLM 812 can store the state information used by companion device 804 as local state information and remote state information. The local state information can reference one or more states of components of companion device 804. The remote state information can reference one or more states of components of other devices, e.g., those having a communications link with companion device 804.

In one embodiment, CLM 812 can store an indication of a current status of processor 810 in the local state information. For example, CLM 812 can store information indicating processor 810 is in the non-sleep mode (W). In the example, (L: W) represents a state information mapping locally maintained by CLM 812 specifically for processor 810. CLM 812 can also store an indication of a current status of processor 806 in the remote state information. For example, CLM 812 can store information indicating that processor 806 is in the sleep mode (S). In the example, (R: S) represents a state information mapping locally maintained by CLM 808 specifically for processor 810.

At time T1, a state change occurs with respect to processor 806 of mobile device 802, where processor 806 wakes up from the sleep mode as represented by transition 822 of waveform 814 transitioning from the bottom dotted line to the top dotted line. Transition 822 of processor 806 can occur for numerous reasons, including being based at least part on a power management schedule, in response to an event (e.g., a user interaction with a user interface of mobile device 802), to process data, or the like. Simultaneously, or nearly simultaneously, processor 806 (or an associated power control module) can send awake indicator 824 (e.g., "W") to CLM 808. Awake indicator 824 can be an explicit instruction or message indicating that processor 806 is awake. In some embodiments, processor 806 can wake up CLM 808 and send awake indicator 824. In some embodiments, when processor 806 powers up and/or begins to initialize CLM 808 for operation, CLM 808 can receive initialization instructions of processor 806 as awake indicator 824.

At time T2, CLM 808 records the state change of processor 806 in the local state information, e.g., (L: W). CLM 808 can then send the state change of processor 806 to companion device 804. For example, CLM 808 can send message 826 to CLM 812 indicating the state change of processor 806. In some embodiments, CLM 808 communicates state changes using a link-layer or other lower level protocol message that does not required interaction with processor 806. Thus, CLM 808 and CLM 812 can exchange state information without requiring their respective processors, thereby further reducing power consumption. In some embodiments, CLM 808 can communicate a binary blob that represents state information for one or more elements of mobile device 802. The binary blob can include one or more bits, flags, headers, fields or the like. Information in the binary blob can indicate to companion device 804 a resultant state of an element, a mode of operation, a state change between two states, or the like.

CLM 812 then can record the state change of processor 806 received from CLM 808 in the remote state information, e.g., as (R: W). In some embodiments, CLM 812 can forward the indication of a state change of processor 806 to processor 810 for processing. In some embodiments, processor 810 can request the current state of processor 806 from CLM 812. These interactions can be indicated by the bi-direction communication arrow 828.

At time T3, processor 810 of companion device 804 determines to enter the sleep mode. Processor 810 (or an associated power control module) can send sleep indicator 830 (e.g., "S") to CLM 812. Sleep indicator 830 can be an explicit instruction or message that processor 810 is going to sleep. CLM 812 can also determine that processor 810 has gone to sleep, such as when detecting a period of non-operation, when processor 810 powers down, when processor 810 de-initializes one or more components of companion device 120, or the like.

At time T4, processor 810 enters the sleep mode as represented by transition 832 of waveform 818. CLM 812 can record an indication of the state change of processor 810 in the local state information, e.g., as (L: S). In some embodiments, CLM 812 can determine whether to send the state change of processor 810 to other devices, such as to devices having a communications link with companion device 804, to devices having a device relationship with companion device 804, and/or the like. In some embodiments, CLM 812 can determine whether to send the state change of processor 810 using the remote state information. As examples, CLM 812 can determine whether a given remote device is awake (e.g., for CLM 812 to send a message) or is asleep (e.g., for CLM 812 to delay delivery of the message or wake the device to process the message). If CLM 812 determines to deliver the state change of processor 810 to mobile device 802, CLM 812 can send message 834 indicating the state change of processor 810.

CLM 808 can then record the state change of processor 810 in the remote state information, e.g., as (R: S). In some embodiments, CLM 808 can forward the state change of processor 810 to processor 806 for processing. In some embodiments, processor 806 can request the current state of processor 810 from CLM 808. These interactions can be indicated by arrow 836 between the state box at the top dotted line for CLM 808 and the top dotted line of processor 806.

At time T5, processor 806 determines to enter the sleep mode. Processor 806 (or an associated power control module) can send sleep indicator 840 (e.g., "S") to CLM 808. Processor 806 then goes to sleep as represented by transition 842 of waveform 814.

At time T6, CLM 808 records the state change of processor 806 in the location state information, e.g., as (L: S). In some embodiments, CLM 808 can determine whether to send the state change of processor 806 to other devices, such as to devices having a communications link with mobile device 802, to devices having a device relationship with mobile device 802, and/or the like. In some embodiments, CLM, 808 can use the remote state information to determine whether to send the state change of processor 806 to another device, e.g., when the remote device is awake.

In some embodiments, CLM 808 can determine to send the state change of processor 806 to companion device 804 even when processor 810 of companion device 804 is asleep. Even though communication between CLM 808 and CLM 812 involves some amount of power consumption, overall power consumption is reduced when processor 810 is not required to process the state change message. The benefit of providing up to date state information is further realized when processor 810 wakens to send information to mobile device 802. Therefore, CLM 808 can send message 844 indicating the state change of processor 806 to CLM 812. CLM 812 can record the state change of processor 806 in the remote state information, e.g., as (R: S).

In some embodiments, CLM 812 can further reduce power consumption at companion device 804 based at least part on the local state information. As an example, CLM 812 can determine to delay delivery of state changes, messages, communications, or the like that may involve processing by processor 810, when the received information fails to satisfy delivery criteria and processor 810 is indicated in the local state information to be asleep. Battery life can be improved by reducing the frequency with which processor 810 is required to wake up to process information. Therefore, CLM 812 can determine to queue the state change of processor 806 for later delivery to processor 810, allowing processor 810 to remain asleep.

As an example, at time T7, CLM 812 can optionally determine whether to send the state change of processor 806 to processor 810, e.g., in order to have processor 810 perform power-consuming operations. In the example, CLM 812 can choose to deliver the state change of processor 806 to processor 810 as indicated by the arrow 846. Processor 810 can then transition from the sleep mode to the non-sleep mode to process the information received from CLM 812. In some embodiments, processor 810 can locally store (cache) state changes of processor 806 received from CLM 812 to improve latency, as processor 810 does not have to query CLM 812 for a current state of processor 806 to determine whether to perform subsequent operations.

CLM 812 can also reduce power consumption at mobile device 802 based at least part on the remote state information. In some embodiments, instead of sending a message to mobile device 802 for handling, the message can be queued for later delivery when the message fails to satisfy delivery criteria and processor 806 is indicated in the remote state information to be asleep. Battery life can be improved by reducing the frequency that processor 806 wakes up to handle messages sent from companion device 804.

Figure 9:
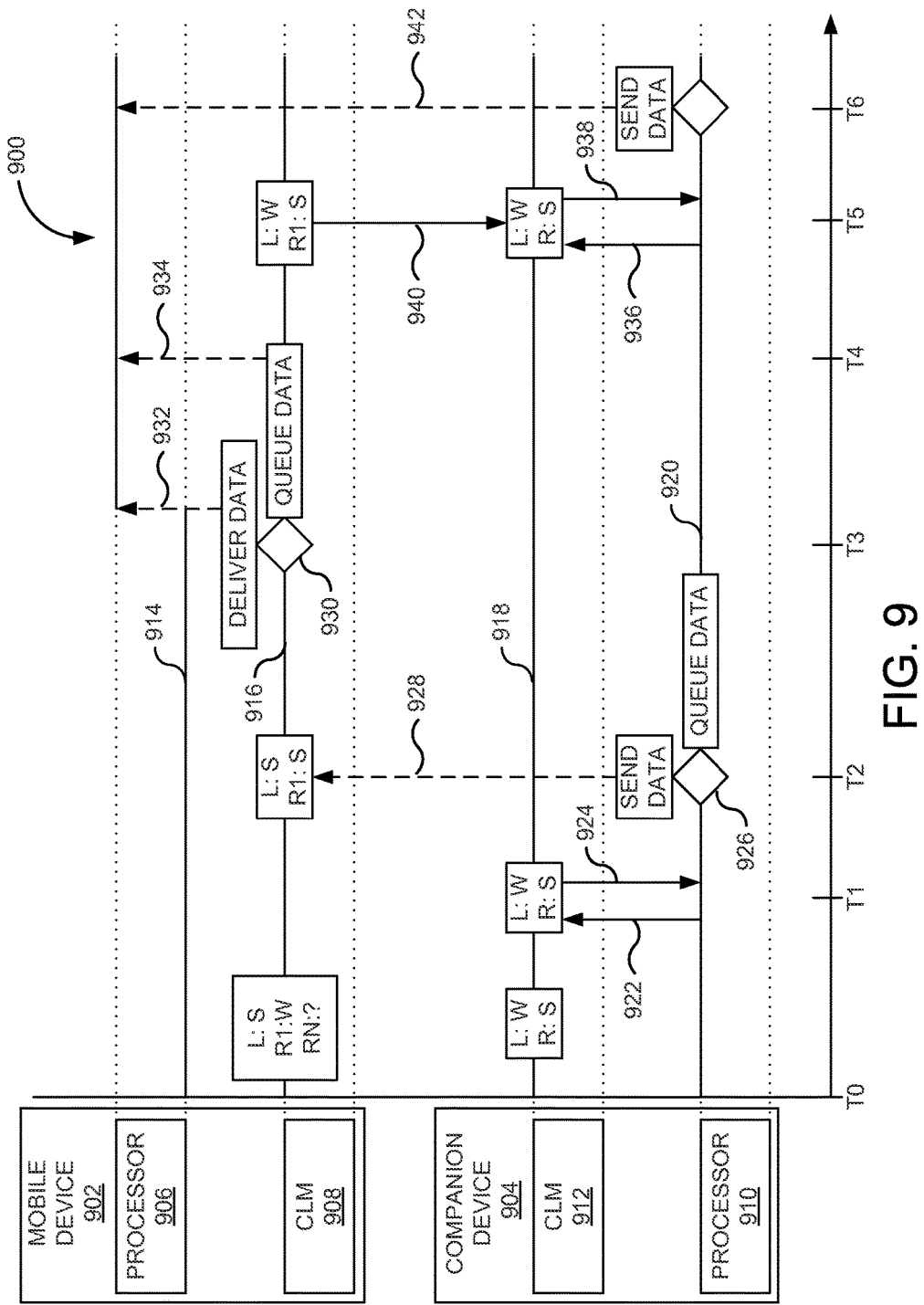
FIG. 9 is a flow diagram indicating an example time-based view of data communication between a mobile device and a companion device being managed using processor state information stored at each device.

FIG. 9 is a flow diagram indicating an example time-based view 900 of data communication between a mobile device (e.g., mobile device 902) and a companion device (e.g., companion device 904) being managed using processor state information stored at each device. At time T0, processor 906 of mobile device 902 is in a sleep mode indicated along waveform 914 by a dark line along the bottom dotted line projected from processor 906. CLM 908 is in a non-sleep mode indicated along waveform 916 by a dark line along the top dotted line projected from CLM 908. CLM 908 of mobile device 902 can store the current state of processor 906 in the local state information, e.g., (L: S). CLM 908 can store the current state of processor 910 of companion device 904 in the remote state information, e.g., as (R1: W). In some embodiments, CLM 908 can store state information of multiple remote devices in the remote state information, e.g., as (R1: W and RN: ?), where R1 identifies companion device 904 and RN identifies another remote device, and "?" represents a placeholder to a reference to a state or mode of operation of the remote device.

CLM 912 is in a non-sleep mode indicated along waveform 918 by a dark line along the top dotted line projected from CLM 912. Processor 910 is in a non-sleep mode indicated along waveform 920 by a dark line along the top dotted line projected from processor 910. CLM 912 can store the current state of processor 910 in the local state information, e.g., as (L: W). CLM 912 can store the current state of processor 906 of mobile device 902 in the remote state information, e.g., as (R: S).

In some embodiments, processor 910 can obtain state information associated with the remote devices from CLM 912, e.g., in order to determine whether to perform operations that involve mobile device 902. As an example, processor 910 can determine the state of processor 906 using the remote state information in order to determine whether to send content destined for mobile device 902 through a connection that companion device 904 maintains with a service. Processor 910 also can determine the state of processor 906 in order to request data, e.g., in the form of photos, music, documents, etc. from mobile device 902. Processor 910 may send a query to CLM 912 requesting the current state of processor 906 as reflected in the remote state information of CLM 912. Processor 910 may directly access one or more lists, tables, or other data structures having the state information maintained by CLM 912.

At time T1, processor 910 has data to be sent to mobile device 902. In some embodiments, processor 910 can determine state information about mobile device 902 from storage, such as a local cache maintained by processor 910. In some embodiments, processor 910 can send query 922 to CLM 912 to obtain state information about mobile device 902. Query 922 can be any type of request, lookup, or formally constructed query. CLM 912 can send response 924 with the results of query 922 for state information. The results can include any information representative of the state, such as a binary value (e.g., on/off), a value indicative of a state or mode of operation, a reference to a mode of operation, or the like.

At time T2, processor 910 determines, based at least part on the remote state information of CLM 912, whether to send the data to mobile device 902 or to delay delivery of the data as represented by decision diamond 926 at time T2. Processor 910 can improve the battery life of mobile device 902 by reducing, based at least part on the remote state information of CLM 912, how often data is sent for processing to mobile device 902. In some embodiments, processor 910 can determine to send the data to mobile device 902 when the data satisfies delivery criteria for sending data to mobile device 902, notwithstanding the current state of processor 906 in the remote state information of CLM 912. In some embodiments, processor 910 can determine to delay sending data to mobile device 902 when the data fails to satisfy the delivery criteria. Mobile device 902 and/or processor 906 may be indicated in the remote state information of CLM 912 to be in a reduced power state. Processor 910 can have CLM 912 send the data in message 928 to mobile device 902, even though the remote state information indicates the current state of processor 906 is sleep mode. In some embodiments, processor 910 can determine that the data satisfies the delivery criteria for sending data to mobile device 902.

As a result of receiving the data at mobile device 902 in message 928, CLM 908 can determine, based at least part on the local state information stored in CLM 908, whether to deliver the data to processor 906 as indicated by decision diamond 930 at time T3. CLM 908 can limit power-consuming operations by processor 906 when data is obtained from companion device 904 using the local state information. In some embodiments, CLM 908 can determine to deliver the data in message 932 at time T3 when the data satisfies delivery criteria for processing data internally, notwithstanding the current state of processor 906 in the local state information of CLM 908. Delivery of the data can cause processor 906 to transition from sleep mode. In some embodiments, CLM 908 can delay delivery of the data when the data fails to satisfy the delivery criteria for processing data internally and processor 906 is indicated in the local state information to be asleep. CLM 908 can later deliver the data in message 934 to processor 906 at time T4.

In some embodiments, processor 910 can also determine in decision diamond 926 to queue the data for later delivery to mobile device 902 when the data fails to satisfy the delivery criteria for sending data to mobile device 902 and processor 906 is indicated in the remote state information to be asleep. Queuing the data can prevent processor 906 from having to perform power-consuming operations whenever companion device 904 has data for mobile device 902. After queuing data, processor 910 can periodically check the current state of mobile device 902, e.g., by querying the remote state information of CLM 912 by sending query 936 and receiving response 938.

At time T5, CLM 908 can communicate state change 940 to CLM 912 indicating that processor 906 is awake. At time T6, processor 910 can determine to send the data to mobile device 902 in message 942 now that processor 906 is awake. Thereby, companion device 904 can improve the battery life of mobile device 902 by reducing, based at least part on the remote state information of CLM 912, how often data is sent for processing at mobile device 902. Where companion device 904 can act as a facilitator to mobile device 902, sending and receiving data on its behalf, companion device 904 can improve usability of mobile device 902, e.g., by performing more computationally expensive operations as well as extending battery life using shared state information.

III. Communication Stack on Mobile Device

The communication of data, which can include state information, from a device (e.g., mobile device 902 or companion device 904) can occur through various protocols (e.g., 802.11 protocols, Bluetooth protocols, and/or near field communication (NFC) protocols). A device can include a link manager for determining which protocol to use for a particular application, and thus through which path data should be sent. A lower level link layer can also perform selections of a particular protocol to use. Further, a user tunnel (UTUN) controller can coordinate a plurality of virtual connections with various client applications to communicate over a common socket connection with another device (e.g., mobile device 902 communicating with companion device 904).

Figure 10:
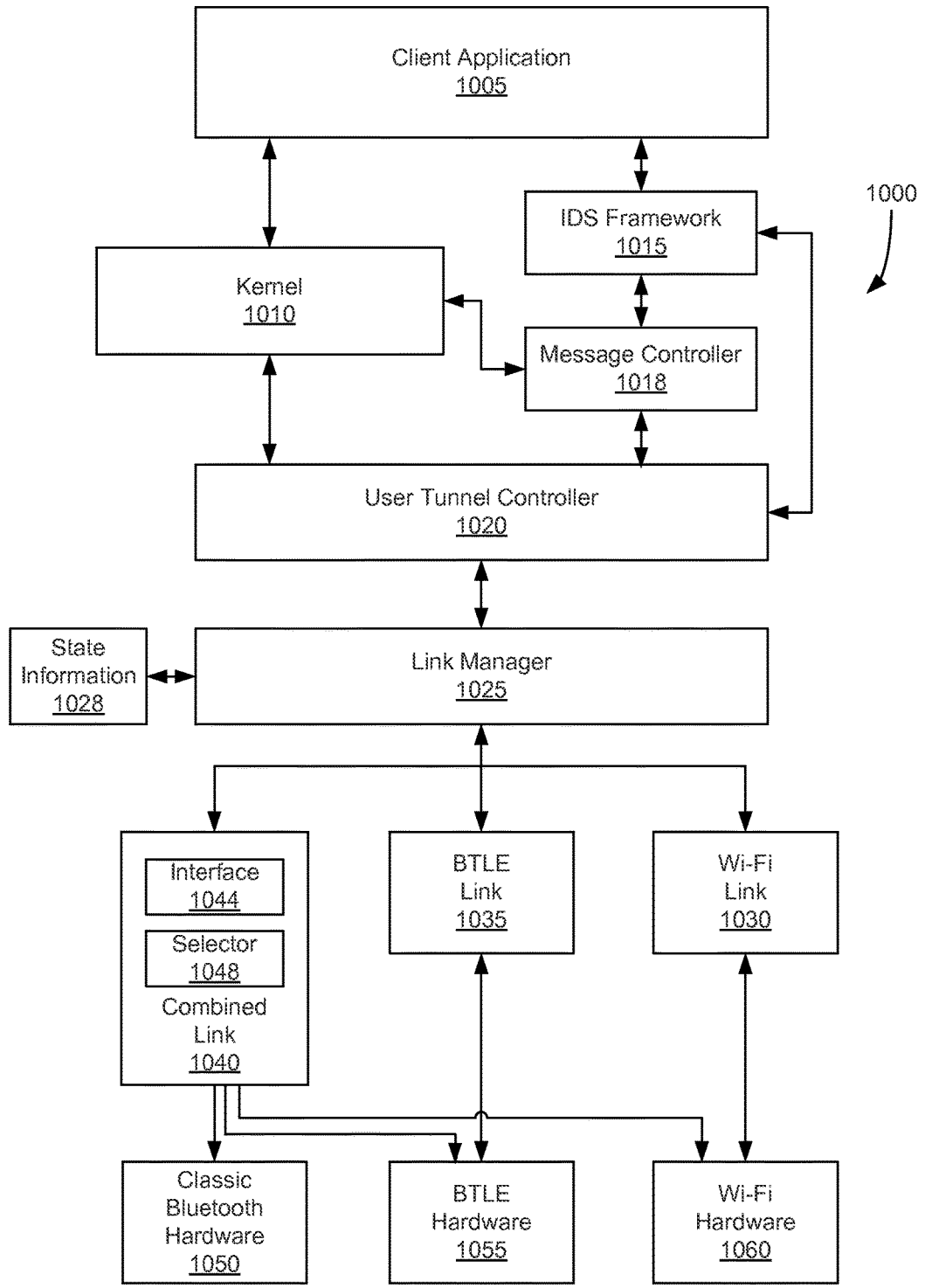
FIG. 10 shows an example protocol stack of an electronic device for communicating data.

FIG. 10 shows a protocol stack 1000 for communicating data. Various modules in protocol stack 1000 can be omitted and/or modified, and other modules can be added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 1005 on the device (e.g., mobile device 902) can request data to be sent to another device (e.g., companion device 904). The request can specify the other device via any suitable identifier, e.g., an account name, an IP address, a MAC address, etc. The request can be before or after the device determines that the other device is within communication range, e.g., as determined by initial signaling, such as a handshake. The data (e.g., in a message or a stream) can be sent via any suitable application layer protocol, such as HTTP, RTP, SMTP, MGCP, etc. The other device can be any device, including another device of the user. The request can made be in response to an action by the user, an internal event (e.g., based at least part on time or other criteria) that may be in a same or other application (e.g., a calendar app), or an external event (e.g., in response to a message from another device). An example of an event is a syncing event.

Before sending data, client application 1005 can submit an open socket request (e.g., in a streaming example). The socket request can use information from an identity services (IDS) framework 1015, which can provide an address (or other type of ID) for the other device. For example, client application 1005 can know account information for the second device (e.g., account information of a different or same user), and IDS framework 1015 can store a list of device IDs for a particular account. IDS framework 1015 can be in communication with an identity management infrastructure, e.g., identity management infrastructure 105, to obtain the list. Thus, IDS framework 1015 can store or otherwise obtain device IDs (e.g., addresses) for all devices that a user has registered with an identity management infrastructure. For example, IDS framework 1015 can request via an IDS daemon to the ID infrastructure to obtain the device IDs. In one implementation, the socket request can be made to kernel 1010.

In a messaging example, the request to send data can go to IDS framework 1015 to obtain a device ID, which can be sent to a message controller 1018 and a user tunnel (UTun controller 1020). UTun controller 1020 can establish a mapping between the device ID and an IP address (e.g., a virtual IP address) when the device ID is not an IP address. A socket can be created between message controller 1018 (which assigns a device ID to the socket) and kernel 1010 (which can assigns an address to the socket, such as a virtual IP address). UTun controller 1020 can be used to create the socket connection between message controller 1018 and kernel 1010. In this manner, the send-date request from client application 1005 does not need to include a device ID, but can specify an account, which can then be cross-referenced by IDS framework 1015 with known devices of the account and their capabilities (e.g., if the request requires certain capabilities). Given that a device ID can be obtained, a pairing does not need to occur prior to creating the socket.

In various embodiments, IDS framework 1015 can receive a particular port/service at the other device from client application 1005, determine the port/service based at least part on information obtained from an identity management infrastructure, or determine the port/service from a token sent in the request. IDS framework 1015 can communicate a device ID and other header information to message controller 1018 and/or UTun controller 1020. For example, IDS framework 1015 and UTun controller 1020 can communicate via cross process communication (XPC). UTun controller 1020 can be part of an IDS daemon, and can receive a device ID from identity management infrastructure 105.

As mentioned above, UTun controller 1020 can create a virtual address that corresponds to the actual device address, where the virtual address can be used to create a virtual socket. A virtual socket can also be created using any device ID (e.g., an actual address of a device or other ID)). As an example, a socket can be created for communication between client application 1005 and kernel 1010 (e.g., in a streaming context), where kernel 1010 can have various sockets open with various client applications. Kernel 1010 can have a single connection to UTun controller 1020 for the other device and multiplex (mux) the data from various client applications into the single connection. Instead or in addition, UTun controller 1020 can also perform the muxing, e.g., if multiple sockets exist between kernel 1010 and UTun controller 1020 for various client applications to the other device. Incoming data can be demultiplexed (dermuxed) for sending to the destination client application.

As another example, a socket can be created between kernel 1010 and message controller 1018 (e.g., in a messaging context), where a socket can be created for each destination device, with different sockets to a same device potentially having different priorities. Thus, a particular virtual socket can be associated with a particular device and a particular priority (e.g., high and low). Message controller 1018 can have various connections to various client applications. Thus, message controller 1018 can provide mux/demux capabilities.

UTun controller can create a primary socket with the other device. When UTun controller 1020 receives data using a virtual connection associated with the second device, it can then map the virtual connection to the primary socket for communicating with the other device. All data for the other device can then be sent out through the primary socket. The virtual address for a virtual socket can be passed back to client application 1005, e.g., in the stream context. In one embodiment, a virtual socket involving kernel 1010 is a TCP socket. The virtual address can have a same format as a regular address, e.g., an IPv6 address. A mux module can include any combination of kernel 1010, message controller 1018, and UTun controller 1020.

When client application 1005 sends data, client application 1005 can use the virtual socket to send data to kernel 1010. For example, the data can be sent using TCP via the virtual socket. Kernel 1010 can implement an UTun interface for communicating with UTun controller 1020. Kernel 1010 would pass the data (e.g., with a TCP header) and the virtual socket identifying the virtual address to UTun controller 1020, which would then use the virtual address to resolve the device address for determining the device socket.

When sending to the data over the device socket, a link manager 1025 can determine which link to use. A link can be a particular combination of a wireless interface protocol (e.g., Bluetooth or Wi-Fi), a transport protocol (e.g., TCP, UDP, etc.), and a destination device. In this manner, UTun controller 1020 does not need to know how the data is being sent, but instead can simply send the data to link manager 1025.

In various embodiments, the determination by link manager 1025 can be made per data packet, per set of data packets, per device socket, and may change from one data packet to another. Link manager 1025 may then select a link for sending the data. In the example shown, a Wi-Fi link 1030 provides software drivers for communicating with one or more Wi-Fi protocols, and BTLE link 1035 provides software drivers for communicating with Bluetooth LE. Wi-Fi link 1030 is in communication with Wi-Fi hardware 1060, and BTLE link 1035 is in communication with BTLE hardware 1055. Wi-Fi link 1030 can be used for various Wi-Fi protocols, such as infrastructure Wi-Fi. In one embodiment, link manager 1025 can try all links to determine whether any of the links can contact the other device, and then use a connected link with a highest predetermined rank or dynamic rank.

Hardware 1050-1060 can be in communication with links assigned to various devices. For example, links 1030, 1035, and 1040 can be assigned for communication with a second device. And, other links that are assigned for communication with a third device can also be in communication with hardware 1050-1060. When a particular hardware receives data, software can identify a particular sending device and then determine the corresponding link, e.g., using header information to determine the link corresponding to the sending device and transport protocol.

In some embodiments, a combined link 1040 can include an interface 1044 for communicating with link manager 1025 and a selector 1048 that selects a particular protocol to use. The protocols can be the same or different from that available to link manager 1025. Selector 1048 can perform similar functions as link manager 1025 in that a particular link is selected. However, link manager 1025 and selector 1048 can use different criteria for determining which link to use. For example, link manager 1025 can determine to use combined link 1040, and selector 1048 can then determine that BTLE hardware 1055 is to be used. The hardware can be contained on a same chip or on separate chips.

One or more protocols can be only available via combined link 1040, such as classic Bluetooth hardware 1050. Link manager 1025 and selector 1048 can use various criteria for determining which link to use, such as power usage of a link, speed of a link (e.g., real-time data rate), and signal strength of a link. A goal of the optimization for selecting a link can be to provide a minimal data rate at a lowest possible energy. Other details about methods and criteria for selecting a link and hardware can be found in U.S. Provisional application Ser. No. 14/656,347, entitled "Dynamic Link Adaptation For Improved Link Margin" (Ref. No. P22725US1) and filed Mar. 12, 2015, which is incorporated by reference.

In some embodiments, in addition to duties performed to manage links, link manager 1025 can use state information 1028. State information 1028 can include local and remote state information. Link manager 1025 can use state information 1028 to determine whether to perform operations, such as handling the internal delivery of messages or the sending messages over the certain links. This can result in an increase in power savings at a device incorporating protocol stack 1000, as state information 1028 stored by link manager 1025 can be used to reduce operations that require processing of the messages. Link manager 1025 can use state information 1028 to more efficiently manage message communication to prevent power usage delaying delivery of messages that a local or remote processor may not be available to handle.

IV. Example Device

Figure 11:
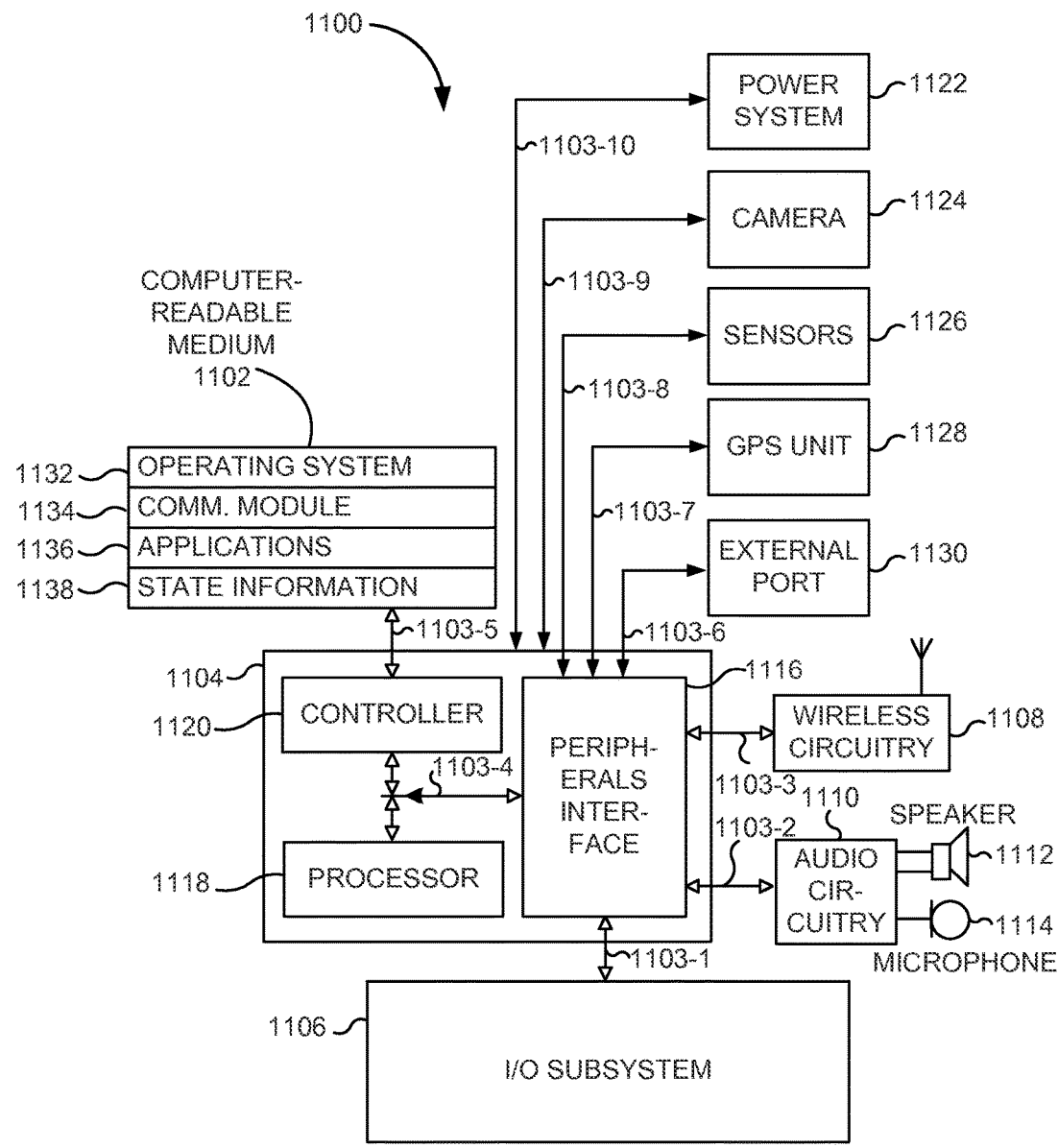
FIG. 11 is a block diagram of an example electronic device.

FIG. 11 is a block diagram of an example electronic device 1100. Device 1100 generally includes computer-readable medium 1102, a processing system 1104, an Input/Output (I/O) subsystem 1106, wireless circuitry 1108, and audio circuitry 1110 including speaker 1112 and microphone 1114. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 11 is only one example of an architecture for device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 1108 is coupled to processing system 1104 via peripherals interface 1116. Peripherals interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats.

Peripherals interface 1116 couple the input and output peripherals of device 1100 to the one or more processors 1118 and computer-readable medium 1102. One or more processors 1118 communicate with computer-readable medium 1102 via a controller 1120. Computer-readable medium 1102 can be any device or medium that can store code and/or data for use by one or more processors 1118. Computer-readable medium 1102 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1116, one or more processors 1118, and controller 1120 can be implemented on a single chip, such as processing system 1104. In some other embodiments, they can be implemented on separate chips.

One or more processors 1118 can correspond to processor 340A, processor 340B, processor 806, processor 810, processor 906, or processor 910. Processor(s) 1118 can include hardware and/or software elements that perform one or more processing functions, such as mathematical operations, logical operations, data manipulation operations, data transfer operations, controlling the reception of user input, controlling output of information to users, or the like. Processor(s) 1118 can be embodied as one or more hardware processors, microprocessors, microcontrollers, field programmable gate arrays (FPGAs), application-specified integrated circuits (ASICs), or the like.

Device 1100 also includes a power system 1122 for powering the various hardware components. Power system 1122 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1100 includes a camera 1124. In some embodiments, device 1100 includes sensors 1126. Sensors can include accelerometers, compass, gyrometer, pressure sensors, audio sensors, light sensors, barometers, and the like. Sensors 1126 can be used to sense location aspects, such as auditory or light signatures of a location. In some embodiments, device 1100 can include a GPS receiver, sometimes referred to as a GPS unit 1128. A mobile device can use a satellite navigation system, such as the Global Positioning System (GPS), to obtain position information, timing information, altitude, or other navigation information. In some embodiments, device 1100 can include external port 1130 (e.g., USB, FireWire, Lightning connector, 110-pin connector, etc.). External port 1130 can be adapted for coupling directly to other devices or indirectly over a network (e.g., the Internet, wireless LAN, etc.).

One or more processors 1118 run various software components stored in computer-readable medium 1102 to perform various functions for device 1100. In some embodiments, the software components include operating system 1132, communication module (or set of instructions) 1134, other applications (computer products, sets of instructions, etc.) 1136, and state information 1138. Operating system 1132 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1134 facilitates communication with other devices over external port 1130 or via wireless circuitry 1108 and includes various software components for handling data received from wireless circuitry 1108 and/or external port 1130.

The one or more applications 1136 on device 1100 can include any applications installed on the device 1100, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

The state information 1138 can include a power state or mode of operation collected about one or more components of device 1100. State information 1138 can include a power state or mode of operation of components of other devices obtained by device 1100. As the mobile device or the companion device, device 1100 can generate local state information and remote state information in state information 1138. Device 1100 (e.g., using wireless circuitry 1108) can use state information 1138 to manage operations locally in order to reduce power usage. Device 1100 can synchronize all or part of the local state information in state information 1138 with the other devices. The other devices can delay sending messages to device 1100 allowing processors 1118 to remain in a sleep state further reducing power consumption.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1106 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device) and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. As used herein, a processor includes a single-core processor, multi-core processor on a same integrated chip, or multiple processing units on a single circuit board or networked. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Thus, although the invention has been described with respect to specific embodiments, it will be appreciated that the invention is intended to cover all modifications and equivalents within the scope of the following claims.

A recitation of "a", "an" or "the" is intended to mean "one or more" unless specifically indicated to the contrary. The use of "or" is intended to mean an "inclusive or," and not an "exclusive or" unless specifically indicated to the contrary.

What is claimed is:

1. A method of managing communications between mobile user devices, the method comprising:
 at a first mobile user device having a display, a first processor configured to execute client applications stored on the first mobile user device and to communicate with the display to provide a user interface for the client applications, and a first memory that stores a remote state of a second processor of a second device:
 determining, by a communications link manager, a change of a local state of the first processor to a first power state;
 transmitting, by the communications link manager to the second device via a communications link, a message indicating the first power state of the first processor;
 obtaining the remote state of the second processor from the first memory, wherein the remote state of the second processor was obtained from the second device;
 determining whether to send data of a client application to the second device via the communications link based at least on the remote state of the second processor, wherein when the remote state of the second processor is indicative of a sleep mode, the determining comprises evaluating one or more criteria, including determining whether a priority of the data is higher than a threshold; and
 sending the data of the client application to the second device via the communications link when the remote state of the second processor is indicative of the sleep mode and the priority of the data is higher than the threshold.

2. The method of claim 1, wherein when the remote state of the second processor is a first power state, determining whether to send the data to the second device via the communications link based at least on the remote state of the second processor comprises:
determining to send the data to the second device when the first power state represents a non-sleep mode of the second processor or when the first power state exceeds a threshold.

3. The method of claim 1,
wherein the one or more criteria further include at least one selected from a message attribute of a data message including the data, a type of the data message, a protocol associated with the data message, or a content of the data message.

4. The method of claim 1, wherein the one or more criteria further include one or more criteria selected from a group of: a type of the data or content of the data.

5. The method of claim 1, further comprising, at the first mobile user device:
queuing the data for later delivery to the second device when the remote state of the second processor indicates a sleep mode of the second processor.

6. The method of claim 1, further comprising, at the first mobile user device:
determining, by the communications link manager, that the first processor is in a sleep state;
receiving, by the communications link manager, a message from the second device;
determining, by the communications link manager, whether to wake up the first processor from the sleep state based at least on the message and one or more delivery criteria;
delaying, by the communications link manager, delivery of the message to the first processor when the message fails to satisfy the one or more delivery criteria; and
delivering, by the communications link manager, the message to the first processor at a later time.

7. The method of claim 1, wherein the transmitting of the message indicating the first power state of the first processor to the second device is in response to determining the change of the local state of the first processor.

8. The method of claim 1, wherein the remote state of the second processor is obtained from the first memory before transmitting the message indicating the first power state of the first processor to the second device, the method further comprising:
determining, by the communications link manager, that the second processor is in a sleep state based at least on the remote state obtained from the first memory; and
determining, by the communications link manager, to transmit the message indicating the first power state of the first processor to the second device such that a communications link manager of the second device is notified of the first power state of the first processor for use when the second processor of the second device awakens.

9. A mobile device comprising:
a first processor;
a first memory storing a remote state of a second processor of another device; and
a first communications interface configured to:
establish a communications link between the mobile device and the other device;
determine a change of a local state of the first processor to a new power state;
transmit, to the other device, a message indicating the new power state of the first processor; and
obtain the remote state of the second processor from the first memory, the remote state of the second processor having been obtained from the other device, wherein when the new power state is a sleep state, and wherein the first communications interface is configured to maintain the communications link with the other device for continued communication of messages with the other device;
the first processor configured to:
query the first communications interface for the remote state of the second processor;
determine to send data to the other device via the first communications interface when the remote state of the second processor is indicative of a first power state;
determine whether to send or to queue the data for later delivery to the other device based at least on the remote state of the second processor being indicative of a second power state, including determining to send the data to the other device by:
determining that the second power state represents a sleep mode of the second processor; and
determining that the data satisfies one or more criteria, wherein the one or more criteria include one or more selected from a group of: a priority of the data, a type of the data, or content of the data.

10. The mobile device of claim 9, wherein to determine to send the data to the other device, the first processor is configured to:
determine that the first power state represents a data processing mode of the second processor.

11. The mobile device of claim 9, wherein to determine to queue the data for later delivery to the other device, the first processor is configured to:
determine that the second power state represents a sleep mode of the second processor and that the data does not satisfy the one or more criteria.

12. The mobile device of claim 11, wherein the first processor is further configured to:
send the queued data to the other device responsive to a change in the remote state of the second processor obtained from the other device.

13. The mobile device of claim 9, the first communications interface further configured to:
record the change in the local state of the first processor.

14. A computer product comprising a non-transitory computer-readable medium storing instructions that when executed control a first device having a communications link with a second device, the first device having a first processor and a first memory storing a remote state of a second processor of the second device, the instructions causing the first device to perform:
establishing, by a communications interface, the communications link between the first device and the second device;
determining, by the communications interface, a change of a local state of the first processor to a new power state;
transmitting, to the second device via the communications link, a message indicating the new power state of the first processor;
obtaining, by the communications interface, the remote state of the second processor from the first memory, the remote state of the second processor having been obtained from the other device, wherein when the new power state is a sleep state, and wherein the communications interface is configured to maintain the communications link with the other device for continued communication of messages with the other device;

querying, by the first processor, the communications interface to obtain the remote state of the second processor from the first memory;

determining whether to send data to the second device based at least part on the remote state of the second processor stored in the first memory;

sending the data to the second device when the remote state of the second processor comprises a non-sleep state;

queuing the data in the first memory for later delivery to the second device when the remote state of the second processor comprises a sleep state;

receiving a change in the remote state of the second processor, wherein receiving the change in the remote state of the second processor comprises receiving one or more flags indicative of a mode of operation of the second processor; and recording the change in the remote state of the second processor in the first memory.

15. The computer product of claim 14, wherein determining whether to send the data to the second device based at least part on the remote state of the second processor in the first memory further comprises:

determining whether the data satisfies one or more criteria.

16. The computer product of claim 14, the instructions further causing the first device to perform:

determining, by a communications link manager, the first processor to be in a sleep state;

receiving, by the communications link manager, a message from the second device; and determining, by the communications link manager, whether to wake up the first processor from the sleep state based at least on the message.

* * * * *